US008446535B2

(12) United States Patent
Miyazaki et al.

(10) Patent No.: US 8,446,535 B2
(45) Date of Patent: May 21, 2013

(54) METHOD OF MANUFACTURING THREE DIMENSIONAL IMAGE DISPLAY DEVICE

(75) Inventors: Kentaro Miyazaki, Tokyo (JP); Takashi Miyauchi, Tokyo (JP); Takeshi Morita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/336,703

(22) Filed: Dec. 23, 2011

(65) Prior Publication Data

US 2012/0094568 A1    Apr. 19, 2012

Related U.S. Application Data

(62) Division of application No. 12/204,356, filed on Sep. 4, 2008, now Pat. No. 8,085,350.

(30) Foreign Application Priority Data

Sep. 5, 2007 (JP) ................................. 2007-230394
Feb. 26, 2008 (JP) ................................. 2008-044999
Mar. 18, 2008 (JP) ................................. 2008-069839
Jul. 10, 2008 (JP) ................................. 2008-180636

(51) Int. Cl.
*G02F 1/1335* (2006.01)
*G02B 27/22* (2006.01)

(52) U.S. Cl.
USPC ............................................ 349/15; 359/463

(58) Field of Classification Search
USPC .............. 385/14, 15; 359/457, 463, 487, 495, 359/501; 439/2, 15, 106, 108
See application file for complete search history.

(56) References Cited

U.S. PATENT DOCUMENTS

| 4,110,014 | A  | 8/1978  | Yevick         |
|-----------|----|---------|----------------|
| 5,884,991 | A  | 3/1999  | Levis et al.   |
| 6,024,451 | A  | 2/2000  | De Vaan et al. |
| 6,791,639 | B2 | 9/2004  | Colgan et al.  |
| 7,564,507 | B2 | 7/2009  | Park           |
| 2004/0240055 | A1 | 12/2004 | Teramoto et al. |
| 2006/0209407 | A1 | 9/2006  | Hamagishi      |
| 2007/0069978 | A1 | 3/2007  | Daiku          |
| 2007/0252922 | A1 | 11/2007 | Oohira         |
| 2008/0088752 | A1 | 4/2008  | Kim et al.     |
| 2010/0009589 | A1 | 1/2010  | Miyauchi et al. |

FOREIGN PATENT DOCUMENTS

| CN | 1525214 A   | 9/2004 |
| CN | 1945794 A   | 4/2007 |
| CN | 1971369 A   | 5/2007 |
| CN | 101162319 A | 4/2008 |
| JP | 9-189883    | 7/1997 |
| JP | 10-268232 A | 10/1998 |
| JP | 2001-75049  | 3/2001 |
| JP | 2003-243162 | 8/2003 |

(Continued)

OTHER PUBLICATIONS

Office Action issued Feb. 13, 2012 in Chinese Patent Application No. 201010505278.6 (with English translation).

(Continued)

*Primary Examiner* — Akm Enayet Ullah
(74) *Attorney, Agent, or Firm* — Oblon, Spivak, McClelland, Maier & Neustadt, L.L.P.

(57) ABSTRACT

A method of manufacturing a three dimensional image display device includes bonding a lens plate having a lenticular lens to a display panel configured to display an image, with a partially-discontinuous frame-shaped adhesive member interposed in between while having the lenticular lens facing the display panel. The method also includes depressurizing a hermetic inner space formed by the display panel, the adhesive member, and the lens plate, and sealing an opening section communicating with the inner space.

8 Claims, 21 Drawing Sheets

FOREIGN PATENT DOCUMENTS

| | | |
|---|---|---|
| JP | 2004-280087 | 10/2004 |
| JP | 3708112 | 8/2005 |
| JP | 2007-115625 | 5/2007 |

OTHER PUBLICATIONS

Notification of Reasons for Refusal issued Mar. 6, 2012 in Japanese Patent Application No. 2008-180636 (with English translation).

Chinese Office Action issued Aug. 15, 2012, in China Patent Application No. 201010505297.9 (with English translation).

Chinese Office Action issued Dec. 12, 2011 in patent application No. 201010505297.9 with English translation.

Japanese Office Action issued Jul. 31, 2012 in Japanese Patent Application No. 2008-180636 with English translation.

Office Action mailed Jan. 31, 2013 in Chinese Patent Application No. 201010505297.9 (with English Translation).

Notice of Questioning dated Mar. 19, 2013, in Japanese Patent Application No. 2008-180636 (Appeal No. 2012-021542).

METHOD OF MANUFACTURING THREE DIMENSIONAL IMAGE DISPLAY DEVICE

CROSS REFERENCE OF THE RELATED APPLICATION

This application is a division of and claims the benefit of priority under 35 U.S.C. §120 from U.S. Ser. No. 12/204,356, filed Sep. 4, 2008, which is based on and claims the benefit of priority from Japanese Patent Applications No. 2007-230394, filed on Sep. 5, 2007, No. 2008-044999, filed on Feb. 26, 2008, No. 2008-069839, filed on Mar. 18, 2008 and No. 2008-180636, filed on Jul. 10, 2008. The entire contents of all of the above documents are incorporated herein by reference.

BACKGROUND OF THE INVENTION

1. Field of the Invention

The present invention relates to a three dimensional image display device, a method of manufacturing the three dimensional image display device, and an apparatus for manufacturing the three dimensional image display device.

2. Description of the Related Art

As display panels for three dimensional image display devices, flat panel display devices are generally used, such as liquid crystal display panels (LCDs) which control the intensity of light by utilizing the orientation of liquid crystals, plasma display panels (PDPs) which cause phosphors to emit light by use of ultraviolet rays of plasma discharges, field emission display panels (FEDs) which cause phosphors to emit light by use of electron beams of field emission electron emitters, and field emission display panels which cause phosphors to emit light by use of electron beams of surface-conduction electron emitters.

As for three dimensional image display systems for three dimensional image display devices, there are various systems such as a multi-view or integral imaging system. As three dimensional image display devices which display three dimensional images using such systems, three dimensional image display devices including lenticular lenses have been developed. If the lenticular lens is used, a three dimensional image can be viewed without use of glasses or the like for three dimensional image viewing.

Generally, when a lenticular lens is provided on a display panel, a lens plate having the lenticular lens is bonded to the display panel by using an adhesive applied in a rectangular frame shape on the display panel. Note that a technique of providing a lenticular lens on a liquid crystal display panel have been proposed for the purpose of improving the efficiency for light utilization (see JP-B No. 3708112, for example).

However, when the lenticular lens is provided on the display panel, it is difficult to achieve complete coherence between the display panel and the lenticular lens and, therefore a gap (spaced distance) may be formed therebetween. If the gap does not fall under an acceptable range (for example, a range of a desired value plus or minus several tens of μm), an error in viewing angle also falls outside an acceptable range. Accordingly, the display quality of a three dimensional image is degraded.

SUMMARY OF THE INVENTION

An object of the present invention is to provide a three dimensional image display device in which the display quality of a three dimensional image is prevented from being degraded, a method of manufacturing the three dimensional image display device, and an apparatus for manufacturing the three dimensional image display device.

A first aspect of the present invention provides a three dimensional image display device including a display panel configured to display an image; and a lens plate which is a plate material having a lenticular lens and which is provided to the display panel, with a frame-shaped adhesive member interposed in between while having the lenticular lens facing the display panel, wherein the display panel, the adhesive member and the lens plate form a hermetic inner space having an internal pressure which is lower than an atmospheric pressure.

A second aspect of the present invention provides a method of manufacturing a three dimensional image display device, including: bonding a lens plate having a lenticular lens to a display panel configured to display an image, with a partially-discontinuous frame-shaped adhesive member interposed in between while having the lenticular lens facing the display panel; and depressurizing a hermetic inner space formed by the display panel, the adhesive member, and the lens plate, and sealing an opening section communicating with the inner space.

A third aspect of the present invention provides a method of manufacturing a three dimensional image display device, including bonding a lens plate having a lenticular lens to a display panel configured to display an image, with a continuous frame-shaped adhesive member interposed in between in reduced-pressure atmosphere while having the lenticular lens facing the display panel.

A fourth aspect of the present invention provides a method of manufacturing a three dimensional image display device, including: bonding a lens plate having a lenticular lens to a display panel configured to display an image, with a partially-discontinuous frame-shaped adhesive member interposed in between, while having the lenticular lens facing the display panel; and heating gas in a hermetic inner space formed by the display panel, the adhesive member, and the lens plate, and sealing an opening section communicating with the inner space.

A fifth aspect of the present invention provides a method of manufacturing a three dimensional image display device, including: bonding a lens plate having a lenticular lens to a display panel configured to display an image, with a continuous frame-shaped adhesive member while filling a getter agent in between, while having the lenticular lens facing the display panel; and heating and activating the getter agent.

A sixth aspect of the present invention provides an apparatus for manufacturing a three dimensional image display device, including: a depressurization chamber; a stage which is provided in the depressurization chamber and on which a display panel configured to display an image is placed; a supporter which is provided in the depressurization chamber and which is configured to support a lens plate having a lenticular lens so that the lens plate is opposite to the stage; a stage moving mechanism configured to move the stage from the outside of the depressurization chamber; a depressurization unit configured to depressurize the depressurization chamber; and a control unit configured to perform a first movement of the stage to cause the stage moving mechanism to perform alignment between the display panel on the stage and the lens plate supported by the supporter, cause the depressurization unit to depressurize the depressurization chamber, and perform a second movement of the stage to cause the stage moving mechanism to press the display panel on the stage against the lens plate supported by the supporter.

A seventh aspect of the present invention provides, in a method of manufacturing a three dimensional image display device, to manufacture a three dimensional image display device by use of the apparatus for manufacturing a three dimensional image display device according to the sixth aspect described above.

An eighth aspect of the present invention provides a three dimensional image display device including: a display panel configured to display an image; a lens plate having a lenticular lens and provided on the display panel with the lenticular lens facing the display panel; a frame-shaped adhesive member which is provided between the display panel and the lens plate so as to surround the lenticular lens and which bonds the display panel to the lens plate; a first polarizer provided on a first surface of the display panel and inside a frame of the adhesive member, the first surface being located on a lenticular lens side; and a second polarizer provided on a second surface of the display panel opposite to the first surface to cover an entire region of the second surface.

A ninth aspect of the present invention provides an apparatus for manufacturing a three dimensional image display device having: a display panel configured to display an image; a lens plate having a lenticular lens and provided on the display panel with the lenticular lens facing the display panel; a frame-shaped adhesive member which is provided between the display panel and the lens plate so as to surround the lenticular lens and which bonds the display panel to the lens plate; a first polarizer provided on a first surface of the display panel and inside a frame of the adhesive member, the first surface being located on a side of the lenticular lens; and a second polarizer provided on a second surface of the display panel opposite to the first surface to cover an entire region of the second surface, the apparatus including a bonding mechanism configured to perform bonding: by causing the display panel and the lens plate to move relatively to each other in an approaching direction with the adhesive member interposed in between while having the lenticular lens facing the first surface of the display panel; by applying a pressure directly to an outer surface region of the lens plate to press the adhesive member from a lens plate side, the outer surface region being opposite to the adhesive member; and by applying a pressure directly to an outer surface region of the second polarizer to press the adhesive member from a display panel side, the outer surface region being opposite to the adhesive member.

A tenth aspect of the present invention provides, in a manufacturing method of a three dimensional image display device, to manufacture a three dimensional image display device using the apparatus for manufacturing a three dimensional image display device according to the ninth aspect described above.

An eleventh aspect of the present invention provides an apparatus for manufacturing a three dimensional image display device configured to bond a display panel to a lens plate having a lenticular lens, the display panel having a plurality of pixels arranged on a plane in a predetermined pattern, the lenticular lens having a plurality of cylindrical lenses consecutively arranged in a width direction orthogonal to a ridge direction of the cylindrical lens, the apparatus including: a display controller configured to cause the display panel to display a bonding image in which one array of the pixels is lit up as a reference line of the display panel as well as other arrays of the pixels are lit up in a direction orthogonal to the reference line at a pitch of a width of the cylindrical lens; an imaging unit configured to take an image of the display panel displaying the bonding image, through the lens plate; a unit configured to obtain a brightness distribution in a direction orthogonal to the reference line, from the image taken by the imaging unit; and a moving mechanism configured to move the display panel and the lens plate relatively to each other based on the obtained brightness distribution so that a spaced distance between the display panel and the lenticular lens falls within an acceptable range.

A twelfth aspect of the present invention provides a method of manufacturing a three dimensional image display device, in which a display panel and lens plate having a lenticular lens are bonded, the display panel having a plurality of pixels arranged on a plane in a predetermined pattern, the lenticular lens having a plurality of cylindrical lenses consecutively arranged in a width direction orthogonal to a ridge direction of the cylindrical lens, the method including: causing the display panel to display a bonding image in which one array of the pixels are lit up as a reference line of the display panel as well as other arrays of the pixels are lit up in a direction orthogonal to the reference line at a pitch of a width of the cylindrical lens; taking an image of the display panel displaying the bonding image, through the lens plate; obtaining a brightness distribution in a direction orthogonal to the reference line, from the taken image; and causing the display panel and the lens plate to move relatively to each other based on the obtained brightness distribution so that a spaced distance between the display panel and the lenticular lens falls within an acceptable range.

DETAILED DESCRIPTION OF THE PREFERRED EMBODIMENTS

First Embodiment

A first embodiment of the present invention will be described with reference to FIGS. 1 to 5.
(Three Dimensional Image Display Device)

Figure 1:
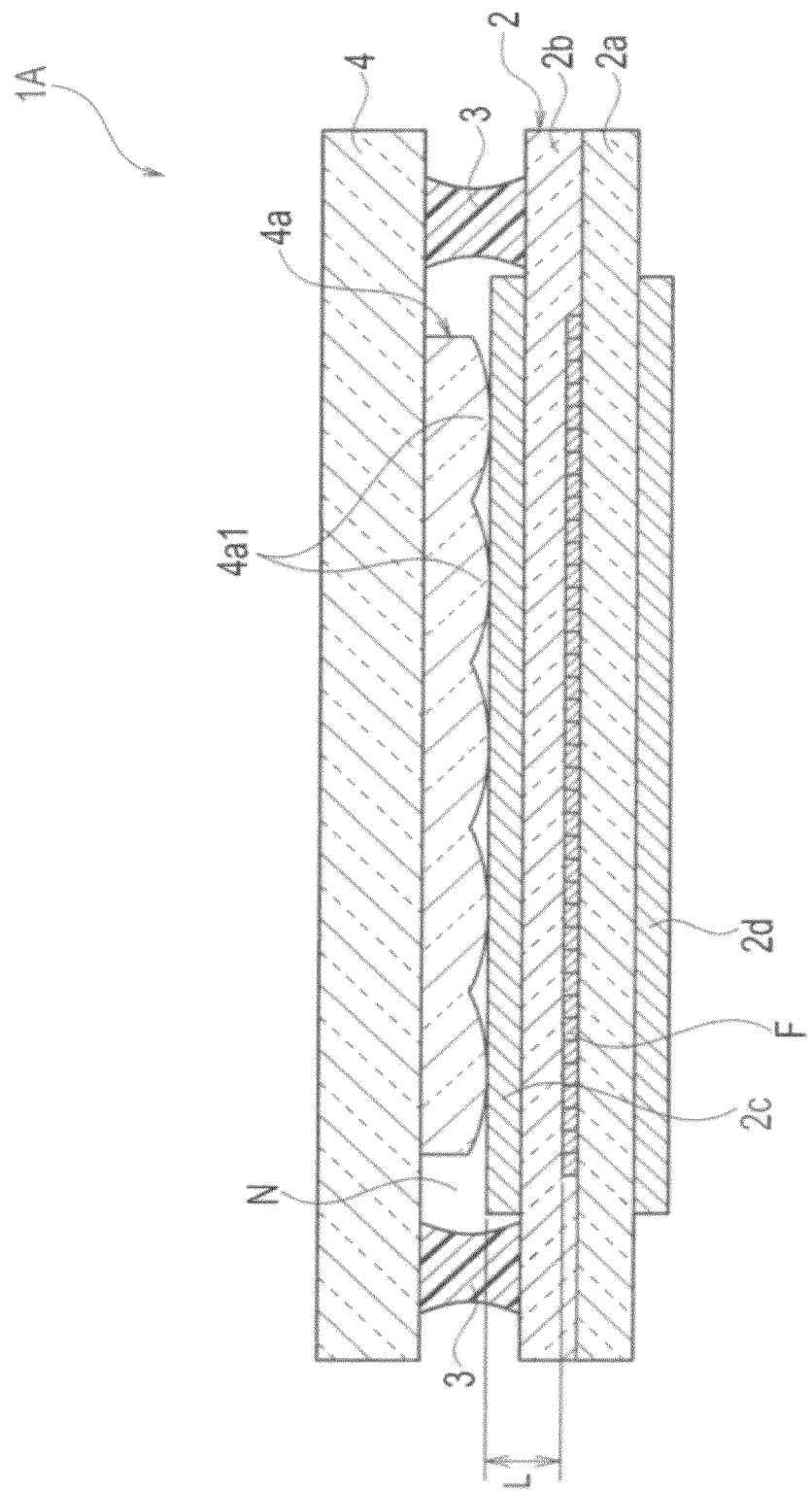
FIG. 1 is a cross-sectional view showing a schematic configuration of a display device according to a first embodiment of the present invention.

As shown in FIG. 1, a three dimensional image display device (hereinafter referred to as "display device") 1A according to the first embodiment of the present invention includes a display panel 2 which displays an image, and a lens plate 4 which is disposed on the display panel 2 with a frame-shaped adhesive member 3 interposed in between and which has a lenticular lens 4a on the display panel 2 side. An inner space N formed by the display panel 2, the adhesive member 3, and the lens plate 4 is hermetically sealed, and the inner space N is in a hermetic state in which the internal pressure thereof is lower than the atmospheric pressure.

The display panel 2 includes a first substrate 2a as a back substrate such as an array substrate, and a second substrate 2b as a front substrate. Inside the surface of the display panel 2, pixels are arranged in a predetermined pattern, e.g., in a matrix (lattice form). As such a display panel 2, a liquid crystal display panel is used, for example. A liquid crystal layer (not shown) is provided between the first substrate 2a and the second substrate 2b, and two polarizers 2c and 2d are provided on outer surfaces of the display panel 2. The polarizers 2c and 2d are arranged to be opposed to each other in the display panel 2.

The first substrate 2a is a rectangular-shaped glass substrate, for example. On the inner surface of the first substrate 2a (the surface facing the second substrate 2b, i.e., the upper surface in FIG. 1), pixel electrodes and electrical wirings for supplying electric potential to the pixel electrodes (both not shown) are provided. The pixel electrodes are provided in a dotted form for the pixels, respectively, and the electrical wirings are provided in a matrix (lattice form). The second substrate 2b is a rectangular-shaped glass substrate, for example. On the inner surface of the second substrate 2b (the surface facing the first substrate 2a, i.e., the lower surface in FIG. 1), a color filter F, a counter electrode (not shown) as a common electrode, and the like are provided. The color filter F is composed of coloring layers (red, green, and blue) provided in a dotted form or stripe form and a light shielding layer such as a black matrix.

The adhesive member 3 is a member for bonding the display panel 2 and the lens plate 4, and provided between the display panel 2 and the lens plate 4 so as to surround the lenticular lens 4a. Specifically, the adhesive member 3 is formed between the display panel 2 and the lens plate 4 in a rectangular frame shape, for example. The adhesive member 3 functions as a side wall which forms the inner space N by the joining of the display panel 2 and the lens plate 4, and thereby the hermeticity of the inner space N is maintained. As the adhesive member 3, a photocurable resin or the like is used, for example.

The lens plate 4 is a lens member, such as a lens substrate or a lens sheet, having the lenticular lens 4a for generating a three dimensional image. The lens plate 4 is a rectangular-shaped substrate, for example. The lenticular lens 4a is formed by adjacently arranging cylindrical lenses (cylindrical surface lenses) 4a1 in a direction (along the shorter side) orthogonal to the axial direction (longitudinal direction, i.e., ridge direction) of the cylindrical lens 4a1. Each of the cylindrical lenses 4a1 has a half-column shape obtained by dividing a cylinder column into two in an axial direction. Here, the cylindrical lens 4a1 is a cylinder-shaped lens having curvature in only one direction, and has one bend surface. The lenticular lens 4a is fixed to an inner surface of the lens plate 4 to be provided as a part of the lens plate 4. Note that the lenticular lens 4a and the lens plate 4 may be united after being formed separately, or integrally formed from the start by use of the same material.

The display device 1A applies a voltage to the pixel electrode corresponding to each to the pixels arranged in a matrix, in accordance with an image signal (image data) with respect, and thereby changes the optical characteristics of the respective pixels (liquid crystal layers) to display the image. Particularly, the display device 1A displays multiple parallax images (two dimensional images) to form a three dimensional image by use of the integral imaging system. Views of the parallax images delicately vary, depending on the viewed angle. This three dimensional image is a natural, easy-to-see, and further eye-friendly image. Further, the range where such a three dimensional image is viewable is provided continuously.

When the lenticular lens 4a and the display panel 2 are not completely bonded, a gap is formed therebetween. That is, a vertical distance L (see FIG. 1), which is a spaced distance between a convex section (lens end) of the lenticular lens 4a and the color filter F, needs to be within an acceptable range (for example, a range within a desired value plus or minus several tens of μm). For example, if the gap as the spaced distance between the convex section of the lenticular lens 4a and the display panel 2 (polarizer 2c) increases, the vertical distance L falls outside the acceptable range and an error in viewing angle also falls outside an acceptable range (for example, outside a range of a desired value plus or minus several tens of μm). Accordingly, the display quality of a three dimensional image is deteriorated. Even when the convex section of the lenticular lens 4a and the display panel 2 (polarizer 2c) are completely bonded, the gap may be formed after manufacture due to a bend caused by a dead weight, partial pressure application from outside, an increase in an ambient temperature, or the like. If the gap increases, the error in viewing angle also falls outside the acceptable range, and thereby the display quality of a three dimensional image is degraded.

In the display device 1A described above, the display panel 2, the adhesive member 3, and the lens plate 4 hermetically seal the inner space N such that the internal pressure is lower than the atmospheric pressure. Accordingly, since the inner space N is in a hermetic state in which the internal pressure thereof is lower than the atmospheric pressure, the convex section of the lenticular lens 4a and the display panel 2 (polarizer 2c) are completely bonded and the coherent state is maintained so that there is no gap and the vertical distance L falls within the acceptable range. Accordingly, the error in viewing angle can be within the acceptable range, whereby the degrading of the display quality of a three dimensional image can be prevented. Particularly, it becomes possible to prevent a change of the gap caused by a bend due to a dead weight, partial pressure application from outside, an increase in an ambient temperature, or the like even after manufacture, whereby the vertical distance L can be maintained within the acceptable range.

As described above, with the display device 1A according to the first embodiment of the present invention, the hermetic inner space N is formed by the display panel 2, the adhesive member 3, and the lens plate 4, and the internal pressure of the inner space N is lower than the atmospheric pressure. Accordingly, since the convex section of the lenticular lens 4a and the display panel 2 are completely bonded, a gap as the spaced distance therebetween does not exist so that the vertical distance L falls within the acceptable range. As a result, the error in viewing angle certainly falls within the acceptable range. Since the display panel 2 and the lens plate 4 are bonded without forming a gap in this manner to suppress an increase in the vertical distance L, i.e., an increase in the error in viewing angle, the degrading of the display quality of a three dimensional image can be prevented.

Particularly, formation of a gap is also prevented, which is possibly formed after manufacture by a bend due to weight, an application of partial external pressure, an increase in ambient temperature, or the like even when the convex section of the lenticular lens 4a and the display panel 2 are completely coherent at the time of manufacture. Accordingly, the vertical distance L can be maintained within the acceptable range and, therefore the error in viewing angle can certainly be kept within the acceptable range.

(Manufacturing Apparatus of Three Dimensional Image Display Device)

Next, a manufacturing apparatus 11 for manufacturing the display device 1A described above will be described.

Figure 2:
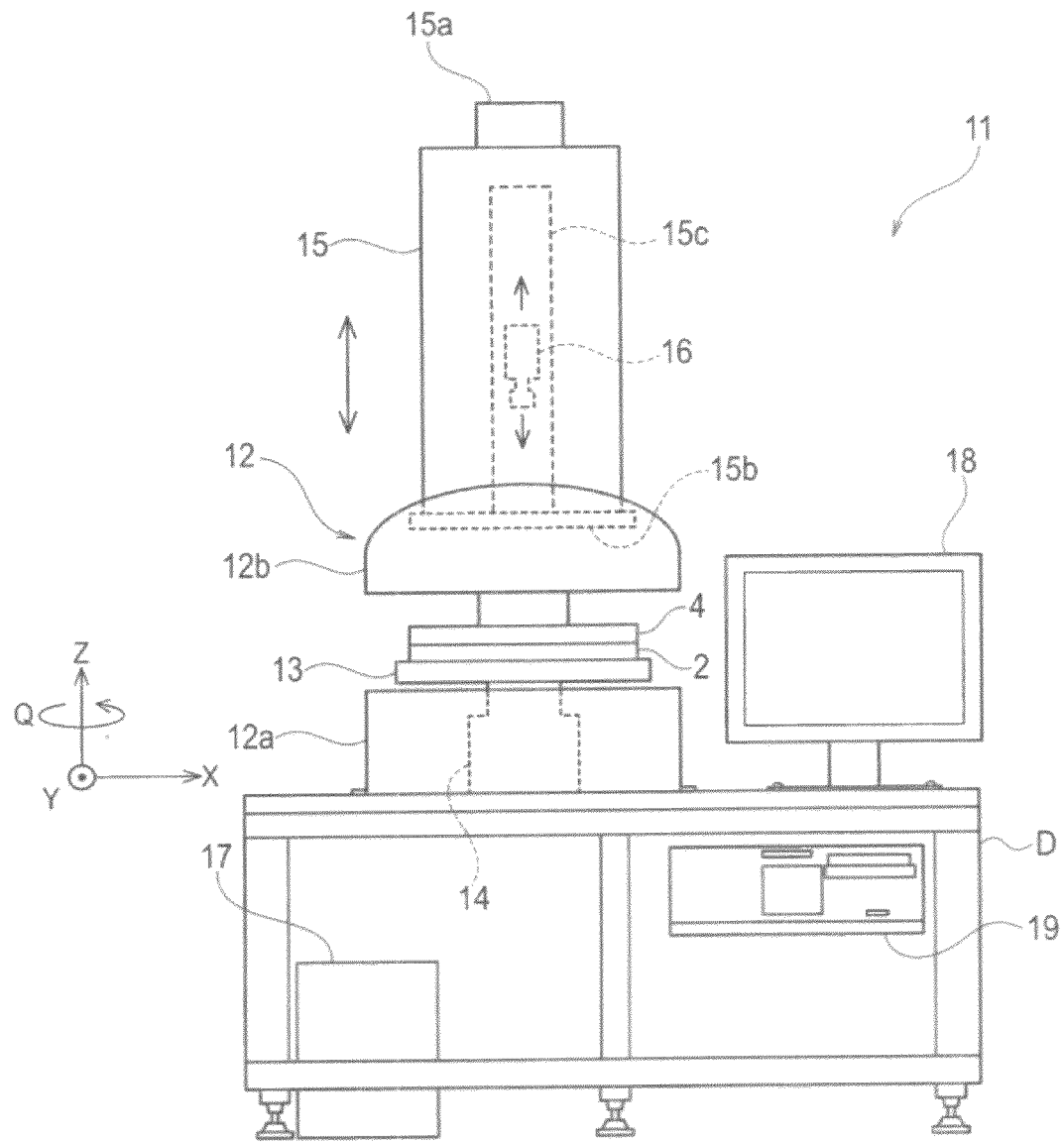
FIG. 2 is a schematic view showing the schematic configuration of an apparatus for manufacturing the display device according to the first embodiment of the present invention.

As shown in FIG. 2, the manufacturing apparatus 11 according to an embodiment of the present invention includes a depressurization chamber 12 composed of a first chamber 12a and a second chamber 12b, a stage 13 provided in the depressurization chamber 12, a stage moving mechanism 14 which moves the stage 13 in X, Y, Z, and θ directions, a chamber holding section 15 which is movably provided to a supporting column 15a to support the second chamber 12b, an imaging section 16 movably provided in the chamber holding section 15, a depressurization unit 17 which depressurizes the depressurization chamber 12, a display section 18 which displays an image and the like imaged by the imaging section 16, and a control unit 19 which controls the sections. These sections are provided to a rack D.

The depressurization chamber 12 is formed such that the first chamber 12a and the second chamber 12b are separable. The depressurization chamber 12 is in a closed state where the first chamber 12a and the second chamber 12b are united or in an opened state where the first chamber 12a and the second chamber 12b are separated. The first chamber 12a is a lower chamber which houses the stage 13 from below, and the second chamber 12b is an upper chamber which houses the stage 13 from above. A closed space of the first chamber 12a and the second chamber 12b, i.e., the inside of the depressurization chamber 12 in the closed state, is depressurized by the depressurization unit 17 to be in a lower pressure state than the atmospheric pressure state (for example, a vacuum state).

The stage 13 is a stage which holds the display panel 2 using a holding mechanism of suction, electrostatic adsorption or the like. The display panel 2 is placed on a holding surface of the stage 13, and is held in that position by the holding mechanism. Note that the frame-shaped adhesive member 3 which is partially discontinuous has been applied to the bonding surface of the display panel 2 (see FIG. 3). The adhesive member 3 has been applied on the display panel 2 to form a frame shape having a discontinuity as a portion which is not continuous.

The stage moving mechanism 14 is a moving mechanism which moves the stage 13 in the X, Y, Z, and θ directions (see FIG. 2). The stage moving mechanism 14 is provided on the rack D, and is electrically connected to the control unit 19. Note that the θ direction is the rotational direction on the X-Y plane in FIG. 2. The stage moving mechanism 14 moves the stage 13 in the X, Y, and θ directions to perform positioning of the display panel 2 and the lens plate 4. Note that the positioning is performed based on alignment marks (positioning marks) assigned to an end section of the display panel 2 and an end section of the lens plate 4 respectively. The alignment marks are imaged by the imaging section 16.

The chamber holding section 15 holds the second chamber 12b, and is provided to the supporting column 15a on the rack D so as to be movable in the Z-axis direction (see FIG. 2) which is the contacting/departing direction with respect to the stage 13. The chamber holding section 15 is caused to move in the Z-axis direction, i.e., the vertical direction, by a moving mechanism (not shown). Accordingly, the depressurization chamber 12 becomes in the opened state or the closed state. The chamber holding section 15 has a pressing section 15b which presses the lens plate 4 placed on the display panel 2 with the adhesive member 3 interposed in between. Further, inside the chamber holding section 15, a space 15c is provided for the imaging section 16 to move in the vertical direction. Note that the pressing section 15b is made of, for example, a transparent member so that the alignment mark can be imaged by the imaging section 16.

The imaging section 16 images the alignment marks of the lens plate 4 and the display panel 2 from the lens plate 4 side.

The imaging section 16 is provided to be movable in the Z-axis direction (see FIG. 2), which is the contacting/departing direction with respect to the stage 13, within the space 15c inside the chamber holding section 15, and is electrically connected to the control unit 19. The imaging section 16 is caused to move in the Z-axis direction, i.e., the vertical direction, by a moving mechanism (not shown). Note that, as the imaging section 16, a CCD camera or the like is used, for example. A relative position between the imaging section 16 and the display panel 2 on the stage 13 change in accordance with the vertical movement and the like of the imaging section 16, which are caused by the moving mechanism. Focusing of the imaging section 16 is performed by the vertical movement caused by the moving mechanism, of the imaging section 16, an autofocus function, or the like.

The depressurization unit 17 is a discharge section which discharges gas (atmosphere) such as air in the depressurization chamber 12. The depressurization unit 17 includes a discharge pipe communicating with the depressurization chamber 12, a pump which discharges the atmosphere in the depressurization chamber 12 via the discharge pipe (both not shown), and the like. The pump is electrically connected to the control unit 19, and sucks and discharges the gas within the depressurization chamber 12 in accordance with the control of the control unit 19.

The display section 18 displays images and the like imaged by the imaging section 16. The display section 18 is provided on the rack D, and is electrically connected to the control unit 19. Note that, as the display section 18, a liquid crystal display, a cathode ray tube (CRT) display, or the like is used, for example.

The control unit 19 includes a controller which collectively controls the sections and a storage section which stores various programs, various data, and the like (both not shown). The storage section has a random access memory (RAM) which functions as a work area of the controller, a nonvolatile memory, and the like. The control unit 19 performs control of the sections based on the various programs, the various data, and the like stored in the storage section. Particularly, the control unit 19 executes a series of data processes of performing calculations, processing, and the like of data, a bonding process for bonding the display panel 2 and the lens plate 4, and the like. The bonding process includes a positioning process for positioning (including an imaging process for imaging), a depressurization process for depressurization, and the like. Note that the storage section stores an imaging condition, a bonding condition (including a depressurization condition), and the like.

(Manufacturing Method of Three Dimensional Image Display Device)

Next, a method of manufacturing the display device 1A (bonding method) using the manufacturing apparatus 11 described above will be described. Note that the control unit 19 of the manufacturing apparatus 11 executes the bonding step to control the sections.

Figure 3:
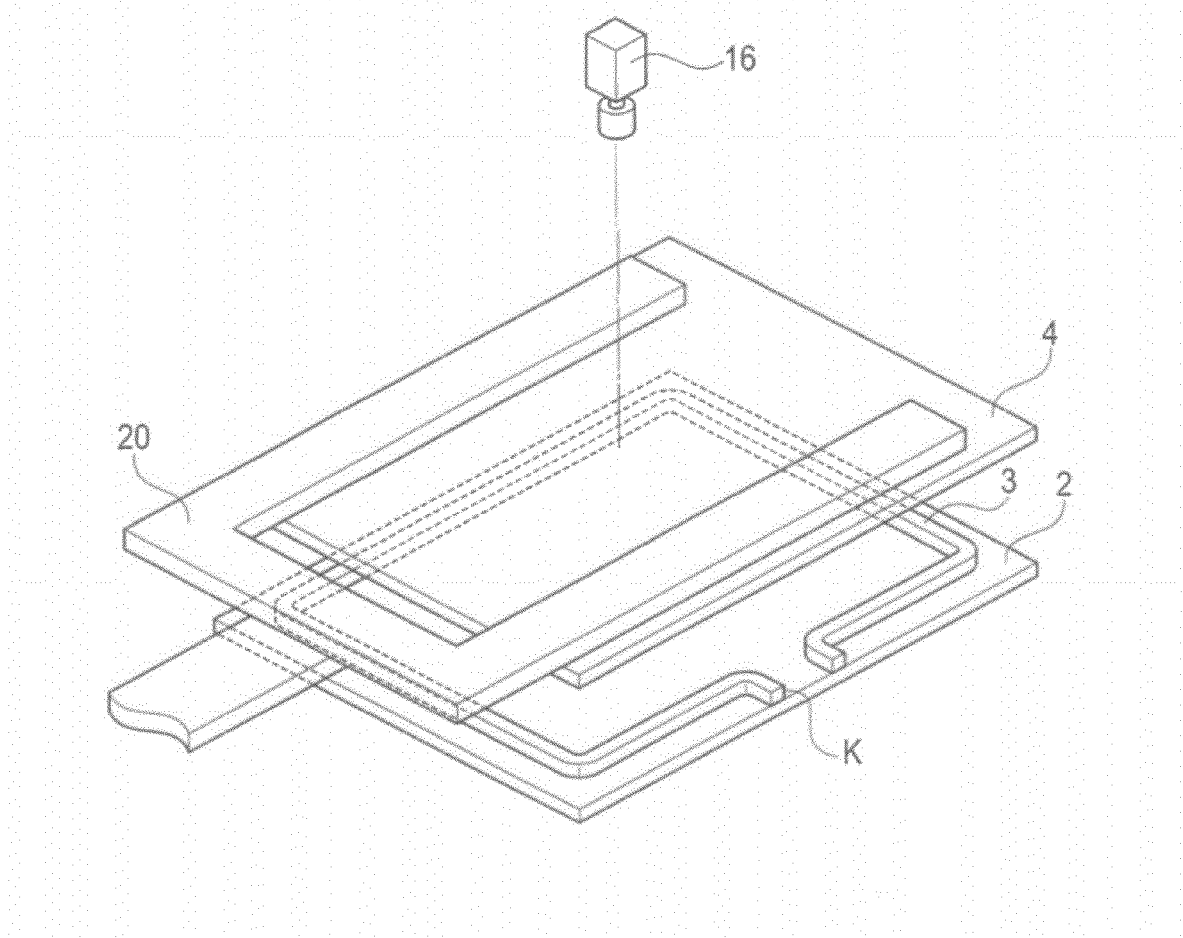
FIG. 3 is a perspective view for illustrating a first step of a manufacturing method using the manufacturing apparatus shown in FIG. 2.
Figure 4:
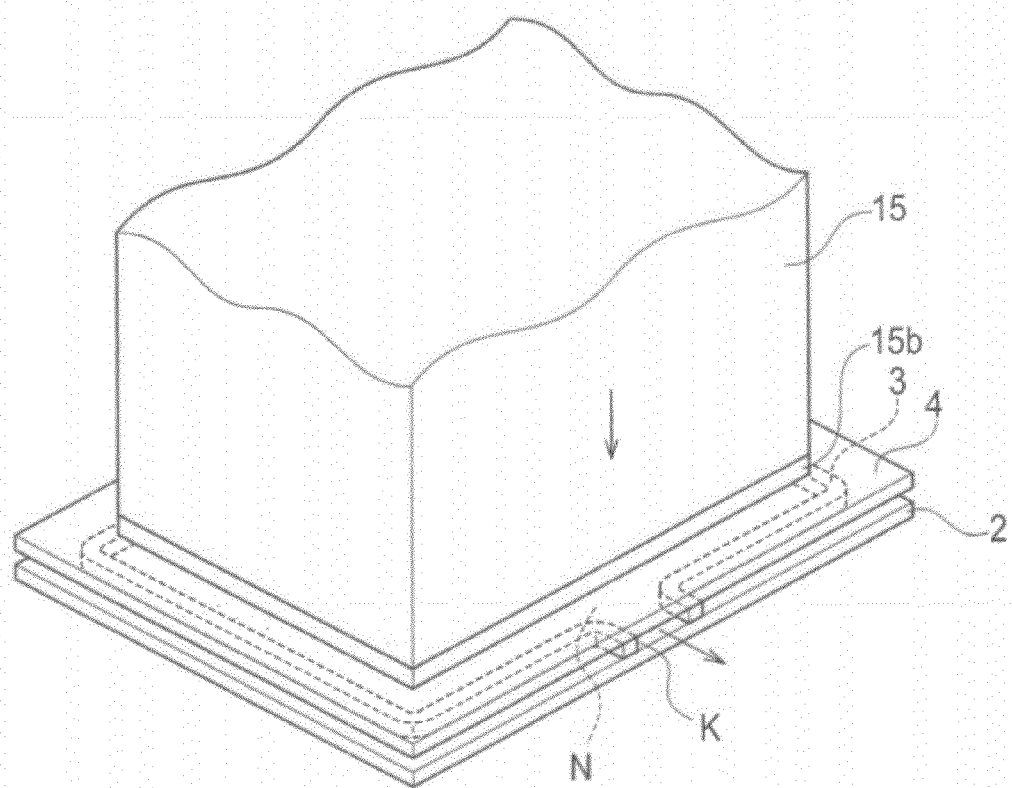
FIG. 4 is a perspective view for illustrating a second step.

Manufacturing steps include a placing step of placing the lens plate 4 while performing positioning with respect to the display panel 2 on the stage 13 as shown in FIG. 3, a depressurizing step of depressurizing the inner space N while pressing the lens plate 4 on the display panel 2 as shown in FIG. 4, a closing step of sealing and closing an opening section K which communicates with the inner space N after the inner space N is depressurized, and an atmosphere recovering step (vacuum breaking step) of restoring the atmospheric pressure inside the depressurization chamber 12.

In the placing step, the display panel 2 is placed on the stage 13 with the depressurization chamber 12 in the opened state. On the display panel 2, the partially-discontinuous frame-shaped (for example, rectangular frame-shaped) adhesive member 3 is applied. The adhesive member 3 is applied on the display panel 2 in a frame shape having a discontinuity as a portion which is not continuous. Next, as shown in FIG. 3, the lens plate 4 is placed on the display panel 2 on the stage 13 with the lenticular lens 4a thereof facing the display panel 2 side by a robot hand 20 of a handling robot or the like. At this time, the positioning of the lens plate 4 and the display panel 2 is performed based on the alignment marks imaged by the imaging section 16. The focusing of the imaging section 16 is performed by the vertical movement of the imaging section 16 caused by the moving mechanism, the autofocus function, and the like. The robot hand 20 is caused to adsorb the lens plate 4 by an adsorbing mechanism (not shown). Then, the adhesive member 3 is irradiated with light for curing. Accordingly, the partially-discontinuous frame-shaped adhesive member 3 is cured.

In the depressurizing step, the chamber holding section 15 is caused to descend by the moving mechanism, the first substrate 2a and the second substrate 2b become coherent, and the depressurization chamber 12 becomes in the closed state. At this time, as shown in FIG. 4, the lens plate 4 on the display panel 2 is pressed by the pressing section 15b of the chamber holding section 15. The pressing force is adjusted by the movement of the stage 13 in the Z-axis direction caused by the stage moving mechanism 14. Next, the depressurization chamber 12 in the closed state is depressurized by the depressurization unit 17. At this time, gas in the depressurization chamber 12 is sucked, and gas in the inner space N is simultaneously sucked from the opening section K communicating with the inner space N. Accordingly, the inner space N is depressurized, and the convex section of the lenticular lens 4a and the display panel 2 (polarizer 2c) become completely coherent. Note that the discontinuity section of the adhesive member 3 becomes the opening section K communicating with the inner space N.

Figure 5:
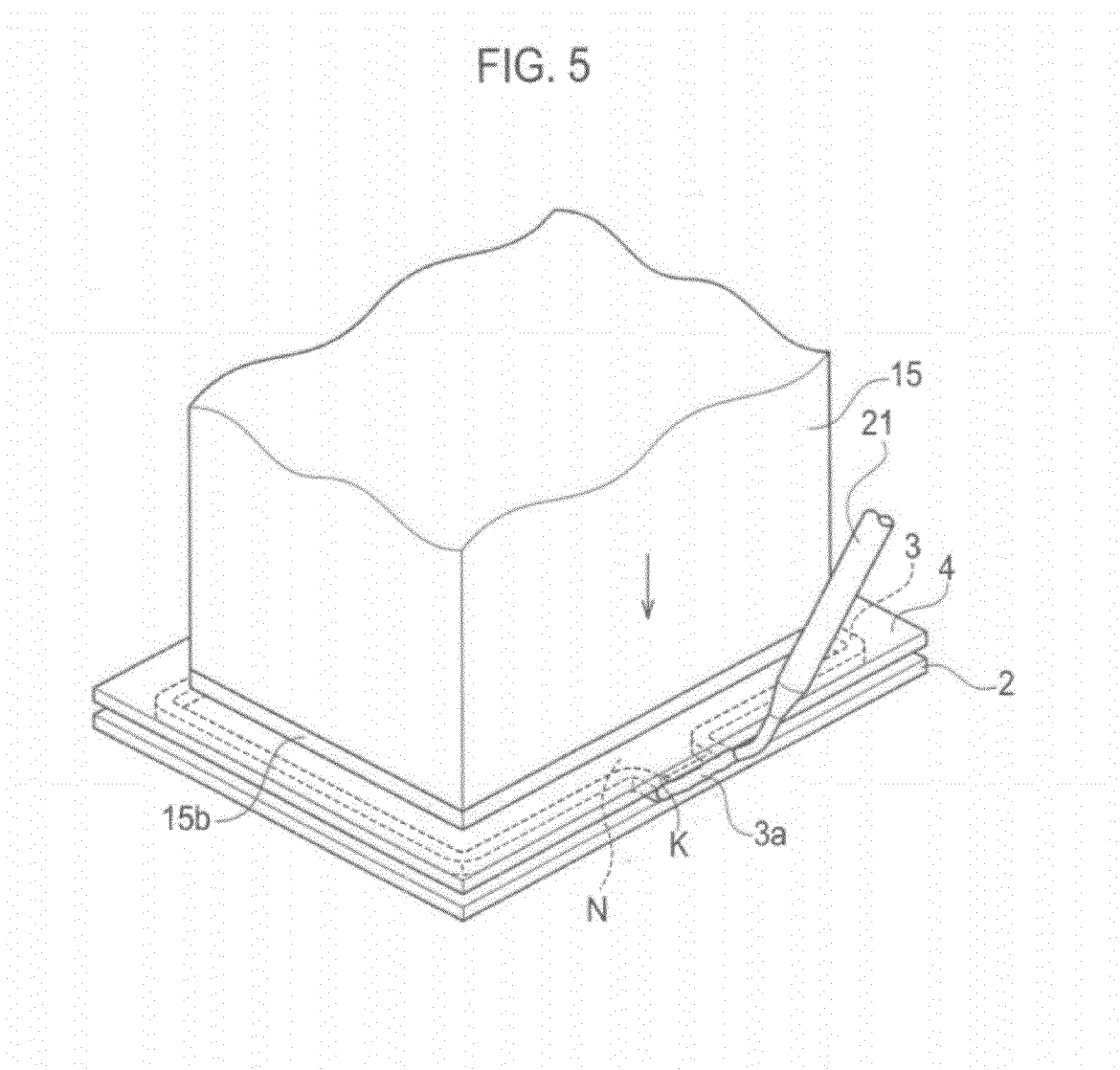
FIG. 5 is a perspective view for illustrating a third step.

In the closing step, an adhesive member 3a is applied to the opening section K by an applying section 21 as shown in FIG. 5 with the inner space N in a depressurized state, and the opening section K is closed by the adhesive member 3a. Next, the adhesive member 3a is irradiated with light for curing. Accordingly, the opening section K is completely closed to hermetically seal the inner space N such that the pressure is lower than the atmospheric pressure, whereby the display device 1A shown in FIG. 1 is completed. At this time, the hermeticity of the inner space N is maintained. Note that the application of the adhesive member 3a by use of the applying section 21 may be performed by a person such as an operator with the depressurization chamber 12 in the depressurized state, or may be performed automatically by a machine such as the applying section 21 provided in the depressurization chamber 12.

In the atmosphere recovering step, the chamber holding section 15 is caused to ascend by the moving mechanism, the first chamber 12a and the second chamber 12b are released from the coherent state, and the depressurization chamber 12 becomes in the opened state. Then, the display device 1A is transferred from the stage 13 to a device for full curing by a person such as an operator or a machine such as a robot, and the adhesive member 3 (including the adhesive member 3a) inside the display device 1A is fully cured.

In the manufacturing steps, the display panel 2 and the lens plate 4 need to be bonded such that the vertical distance L (see FIG. 1), which is the spaced distance between the convex section (lens end) of the lenticular lens 4a and the color filter F, falls within an acceptable range (for example, a range of several tens of μm plus or minus a desired value), i.e., such that the gap as the spaced distance between the convex section of the lenticular lens 4a and the display panel 2 is eliminated. If the gap increases, the vertical distance L falls outside the acceptable range and the error in viewing angle also falls outside the acceptable range (for example, outside a range of a desired value plus or minus several tens of μm), whereby the display quality of a three dimensional image is degraded.

In the manufacturing steps described above, the display panel 2 and the lens plate 4 are bonded, the inner space N formed by the display panel 2, the adhesive member 3, and the lens plate 4 is depressurized, and the opening section K communicating with the inner space N is sealed. Accordingly, the inner space N becomes in the hermetic state in which the internal pressure thereof is lower than the atmospheric pressure, thereby the convex section of the lenticular lens 4a and the display panel (polarizer 2c) become completely coherent. Since the coherent state is maintained, there is no gap and the vertical distance L falls within the acceptable range. As a result, the error in viewing angle can fall within the acceptable range, whereby the degrading of the display quality of a three dimensional image can be prevented. Particularly, a change of the gap caused by a bend due to a dead weight, partial pressure application from outside, an increase in an ambient temperature, or the like can be prevented even after manufacture, whereby the vertical distance L can be maintained within the acceptable range.

As described above, in the manufacturing method according to the first embodiment of the present invention, the lens plate 4 having the lenticular lens 4a and the display panel 2 which displays an image are bonded with the partially-discontinuous frame-shaped adhesive member 3 interposed in between while the lenticular lens 4a is arranged to face the display panel 2, the inner space N is then depressurized, and then the opening section K communicating with the inner space N is sealed. Thereby, the inner space N becomes in the hermetic state in which the internal pressure thereof is lower than the atmospheric pressure, and the convex section of the lenticular lens 4a and the display panel 2 (polarizer 2c) become completely coherent. Thus, the gap as the spaced distance thereof does not exist, and the vertical distance L falls within the acceptable range. As a result, the error in viewing angle certainly falls within the acceptable range.

Since the display panel 2 and the lens plate 4 can be bonded without forming the gap in this manner, and an increase of the vertical distance L, i.e., an increase in the error in viewing angle, can be suppressed, the degrading of the display quality of a three dimensional image can be prevented. Particularly, formation of a gap is also prevented, which is possibly formed after manufacture due to a bend caused by a dead weight, partial pressure application from outside, an increase in an ambient temperature, or the like even when the convex section of the lenticular lens 4a and the display panel 2 are completely coherent at the time of manufacture. Accordingly, the vertical distance L can be maintained within the acceptable range. Thereby, the error in viewing angle can certainly be kept within the acceptable range.

In the bonding step, since the lens plate 4 is pressed in a direction of causing coherence between the lens plate 4 and the display panel 2, the convex section of the lenticular lens 4a and the display panel 2 can certainly be made coherent. Thereby, the vertical distance L can certainly fall within the acceptable range. Note that, although the lens plate 4 is pressed herein, it is not limited to this. Accordingly, one or both of the display panel 2 and the lens plate 4 may be pressed.

Modified Examples 1 to 3 of the manufacturing method of the display device 1A described above will now be described.

In Modified Example 1, the adhesive member 3 is applied on the display panel 2 in a continuous frame shape, the placing step and the depressurizing step are further performed as a single step, and the closing step is not performed. In the step of performing the placement and the depressurization, the display panel 2 is placed on the stage 13 with the depressurization chamber 12 in the opened state. On the display panel 2, a continuous frame-shaped (for example, rectangular frame-shaped) adhesive member 3 is applied. Next, the depressurization chamber 12 is closed, and the lens plate 4 is placed on the display panel 2 on the stage 13 in a reduced-pressure atmosphere while having the lenticular lens 4a of the lens plate 4 facing the display panel 2. At this time, the positioning of the lens plate 4 and the display panel 2 is performed, in the depressurization chamber 12 in the closed state, based on the alignment marks imaged by the imaging section 16. Note that the lens plate 4 is placed on the display panel 2 on the stage 13 by a machine (not shown) for placement provided in the depressurization chamber 12, with the depressurization chamber 12 in the closed state after the positioning.

In the manufacturing method according to Modified Example 1, the lens plate 4 having the lenticular lens 4a and the display panel 2 which displays an image are bonded in the reduced-pressure atmosphere, with the continuous frame-shaped adhesive member 3 interposed in between while the lenticular lens 4a is arranged to face the display panel 2. Thereby, the inner space N becomes in the hermetic state in which the internal pressure thereof is lower than the atmospheric pressure and the convex section of the lenticular lens 4a and the display panel 2 (polarizer 2c) become completely coherent. Accordingly, an effect similar to that of the manufacturing method of the display device 1A described above can be obtained. Particularly, since the placing step and the depressurizing step are performed simultaneously and the closing step further becomes unnecessary, the number of steps can be reduced so that the manufacturing time can be reduced as a result.

In Modified Example 2, the adhesive member 3 is applied on the display panel 2 in a partially-discontinuous frame shape, the depressurization chamber 12 in the closed state is not depressurized in the depressurizing step, the gas (for example, gas in the depressurization chamber 12 in the closed state) in the inner space N is heated, and the opening section K is sealed in the closing step with the gas of the inner space N in the heated state. Accordingly, since the opening section K is sealed in a state where the gas temperature of the inner space N is higher than the room temperature, the inner space N becomes in the hermetic state in which the internal pressure thereof is lower than the atmospheric pressure when the gas temperature of the inner space N decreases to the room temperature thereafter. Note that the manufacturing apparatus 11 is provided with a mechanism (not shown) which heats the gas inside the depressurization chamber 12.

In the manufacturing method according to Modified Example 2, the lens plate 4 having the lenticular lens 4a and the display panel 2 which displays an image are bonded, with the partially-discontinuous frame-shaped adhesive member 3 interposed in between, while the lenticular lens 4a is arranged to face the display panel 2. Subsequently, the gas in the inner space N formed by the display panel 2, the adhesive member 3, and the lens plate 4 is heated, and then the opening section K communicating with the inner space N is sealed. Thereby, the inner space N becomes in the hermetic state in which the internal pressure thereof is lower than the atmospheric pressure when the temperature of the gas in the inner space N returns to room temperature, and the convex section of the lenticular lens 4a and the display panel 2 (polarizer 2c) become completely coherent. Accordingly, an effect similar to that of the manufacturing method of the display device 1A described above can be obtained.

In Modified Example 3, the adhesive member 3 is applied on the display panel 2 in a continuous frame shape. Further, a getter agent is filled in the inner space N in the placing step, the depressurization chamber 12 in the closed state is not depressurized in the depressurizing step, the gas (for example, gas in the depressurization chamber 12 in the closed state) in the inner space N is heated, and the closing step is not performed. Accordingly, the getter agent filled in the inner space N is activated, and the internal pressure of the inner space N becomes lower than the atmospheric pressure, so that the inner space N becomes in the hermetic state in which the internal pressure thereof is lower than the atmospheric pressure. Here, the getter agent adsorbs gas (gas molecules) such as air and water vapor, for example. Note that the manufacturing apparatus 11 is provided with a mechanism (not shown) which heats the gas inside the depressurization chamber 12.

In the manufacturing method according to Modified Example 3, the lens plate 4 having the lenticular lens 4a and the display panel 2 which displays an image are bonded, with the continuous frame-shaped adhesive member 3 interposed in between, while the getter agent is filled in the internal space N such that the lenticular lens 4a faces the display panel 2. The inner space N then becomes in the hermetic state in which the internal pressure thereof is lower than the atmospheric pressure by heating and activating the getter agent so that the convex section of the lenticular lens 4a and the display panel 2 (polarizer 2c) become completely coherent. Accordingly, an effect similar to that of the manufacturing method of the display device 1A described above can be obtained. Particularly, since the closing step becomes unnecessary, the number of steps can be reduced. As a result, the manufacturing time can be reduced.

Second Embodiment

A second embodiment of the present invention will be described with reference to FIGS. 6 to 9.

A three dimensional image display device (hereinafter referred to as "display device") according to the second embodiment of the present invention has the same structure as the display device 1A according to the first embodiment. Thus, in the second embodiment, portions different from the first embodiment will be described. Note that, in the second embodiment, descriptions of the same portions as the portions described in the first embodiment will be omitted.

(Apparatus for Manufacturing Three Dimensional Image Display Device)

Figure 6:
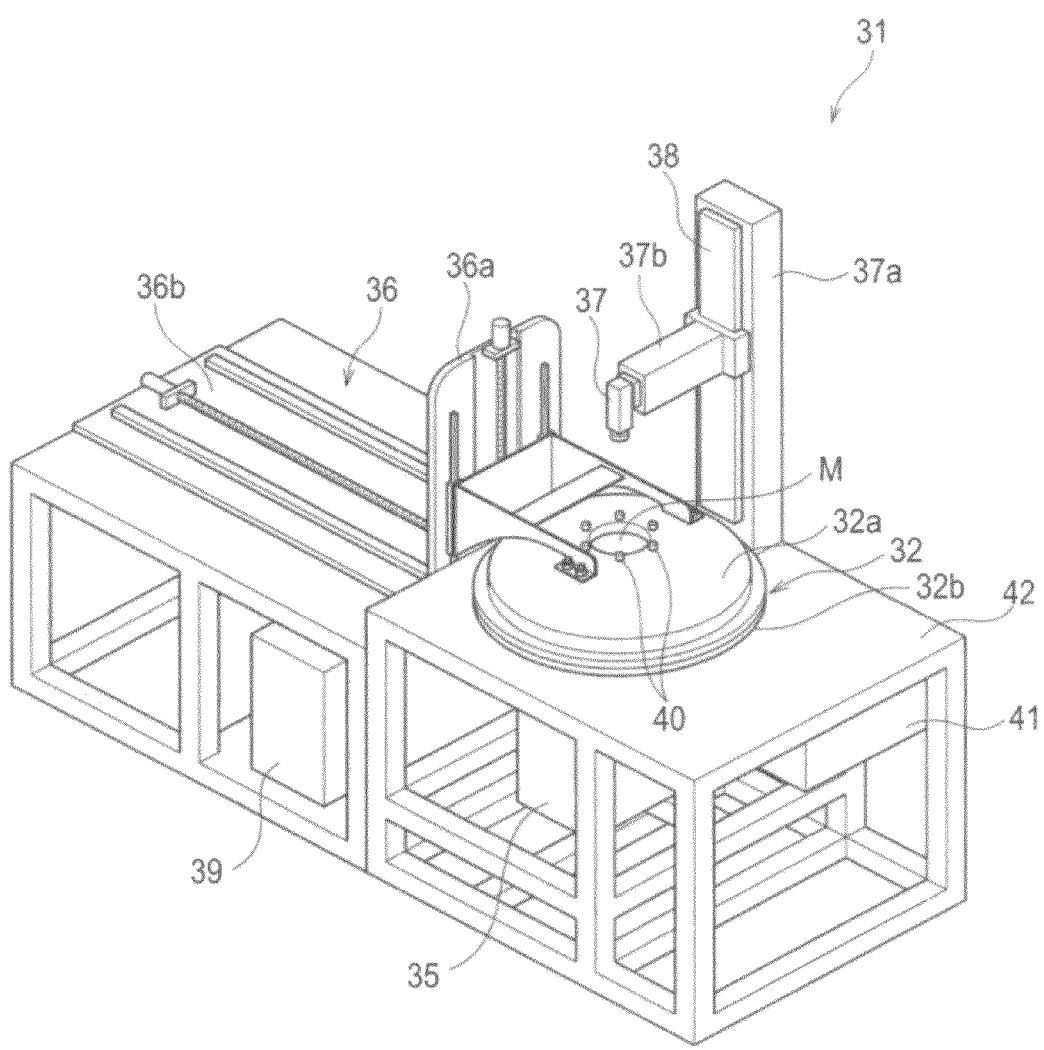
FIG. 6 is an external perspective view showing a schematic configuration of an apparatus for manufacturing a display device according to a second embodiment of the present invention.
Figure 7:
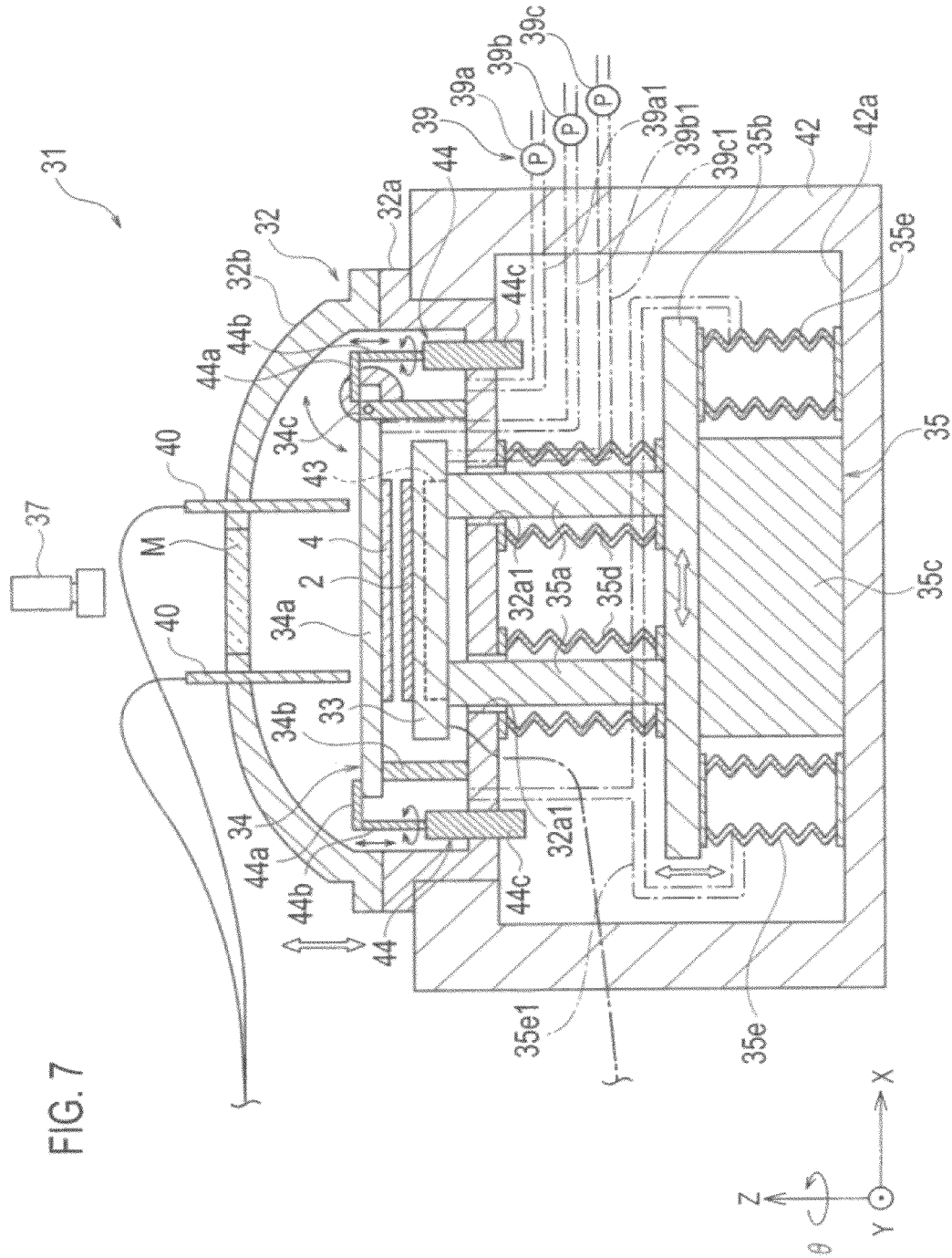
FIG. 7 is a cross-sectional view showing the schematic configuration of a part of the manufacturing apparatus shown in FIG. 6.

As shown in FIGS. 6 and 7, a manufacturing apparatus 31 according to the second embodiment of the present invention includes a depressurization chamber 32 formed of a first chamber 32a and a second chamber 32b, a stage 33 provided in the depressurization chamber 32, a supporter 34 which supports the lens plate 4 at a predetermined height to face the stage 33, a stage moving mechanism 35 which moves the stage 33 in the X, Y, Z, and θ directions, a chamber moving mechanism 36 which moves the second chamber 32b in the X and Z-axis directions, an imaging section 37 which performs imaging operations, an imaging section moving mechanism 38 which moves the imaging section 37 in the Z-axis direction, a depressurization unit 39 which depressurizes the depressurization chamber 32, irradiation heads 40 which perform irradiation with light for curing, and a control unit 41 which controls these sections. The sections are provided to a rack 42.

The depressurization chamber 32 is formed such that the first chamber 32a and the second chamber 32b are separable. The depressurization chamber 32 is in a closed state where the first chamber 32a and the second chamber 32b are united, or is in an opened state where the first chamber 32a and the second chamber 32b are separated. The first chamber 32a is a lower chamber which houses the stage 33 from below, and the second chamber 32b is an upper chamber (lid chamber) which houses the stage 33 from above. A closed space of the first chamber 32a and the second chamber 32b, i.e., the inside of the depressurization chamber 32 in the closed state, is depressurized by the depressurization unit 39 to be in a lower pressure state (for example, a vacuum state) than the atmospheric pressure state.

The stage 33 is a stage which holds the display panel 2 using a holding mechanism of suction and adsorption. The display panel 2 is placed on a holding surface of the stage 33, and is held in that position by the holding mechanism. Note that the continuous frame-shaped adhesive member 3 has been applied to a bonding surface of the placed display panel 2.

Figure 8:
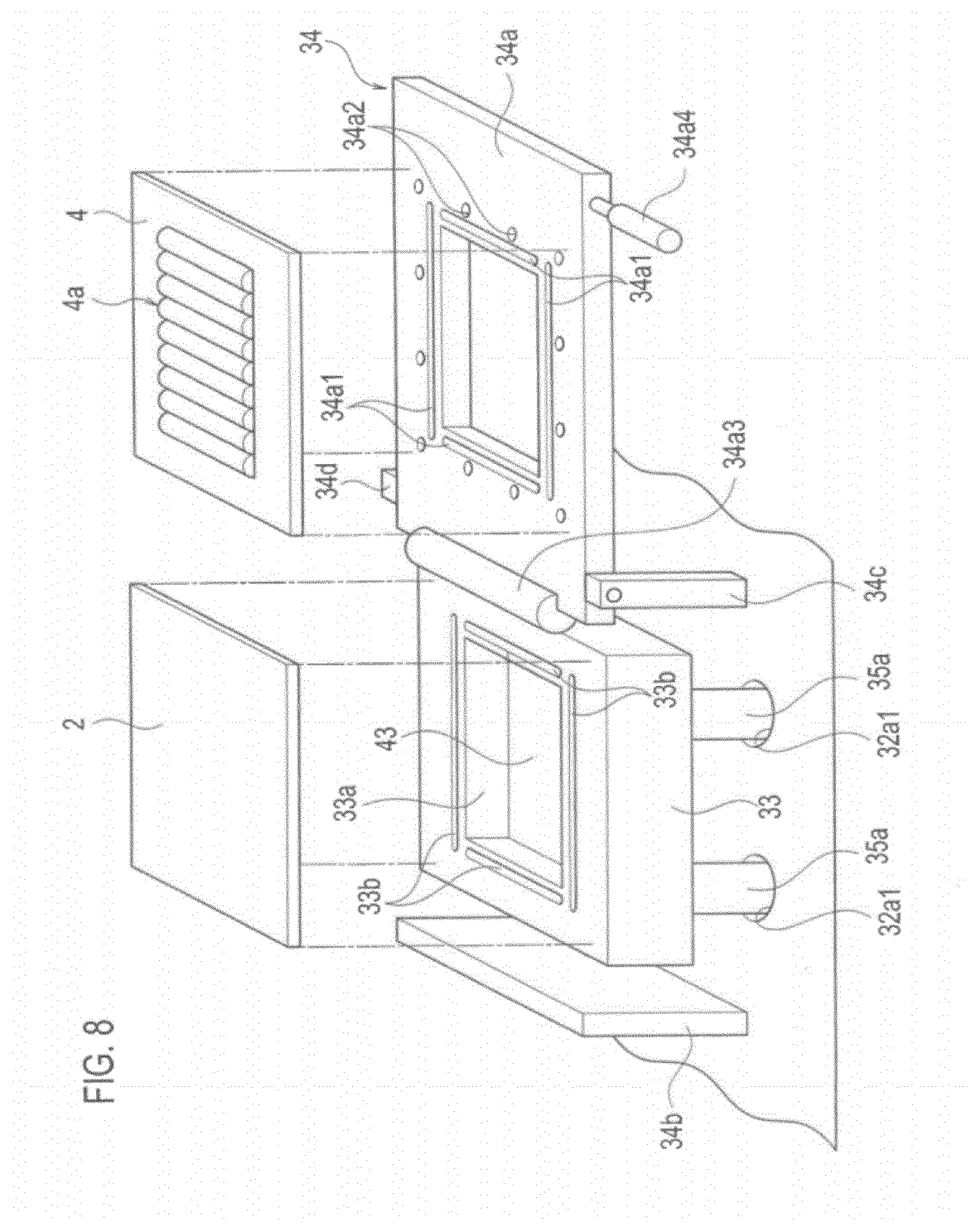
FIG. 8 is a perspective view showing the schematic configuration of a part of the manufacturing apparatus shown in FIG. 7.

As shown in FIGS. 7 and 8, a light irradiation section 43 such as a backlight which performs light irradiation is provided inside the stage 33. The light irradiation section 43 turns on light for the imaging of the alignment mark (alignment chart) when the display panel 2 and the lens plate 4 are to be bonded. The light irradiation section 43 is electrically connected to the control unit 41, and turns the light on and off in accordance with the control by the control unit 41. Note that, as shown in FIG. 8, an opening section 33a is formed, for example, in a rectangular shape to be located substantially in the center of the stage 33 and, therefore light emitted from the light irradiation section 43 enters the display panel 2 from the opening section 33a. Moreover, adsorption grooves 33b are provided to the holding surface of the stage 33 so as to be located along the circumference of the opening section 33a.

As shown in FIGS. 7 and 8, the supporter 34 is composed of a holding frame 34a, which holds the lens plate 4 in a removable manner, and a supporting plate 34b and a pair of supporting members 34c and 34d which support the holding frame 34a at a predetermined height with respect to the stage 33. The holding frame 34a holds the periphery of the lens plate 4 using the holding mechanism of suction and adsorption. The holding frame 34a is formed of, for example, metal or the like in order to obtain necessary strength. The supporting plate 34b and the pair of supporting members 34c and 34d are arranged in positions facing each other with the stage 33 interposed in between, and are secured to a bottom surface of the first chamber 32a.

As shown in FIGS. 7 and 8, the holding frame 34a is revolvably provided to upper end sections of the pair of supporting members 34c and 34d. The holding frame 34a is provided with adsorption grooves 34a1, through holes 34a2, a counter weight 34a3, and a handle 34a4. The adsorption grooves 34a1 are each formed on the holding surface of the holding frame 34a so as to be located along the circumference of an opening of the holding frame 34a. The through holes 34a2 cause lights emitted from the irradiation heads 40 to pass therethrough, respectively. Accordingly, light for curing is irradiated onto the adhesive member 3 located between the display panel 2 and the lens plate 4 in the coherent state. An operator holds the handle 34a4 to revolve the holding frame 34a. A free end of the holding frame 34a with the lens plate 4 held abuts on an upper end section of the supporting plate 34b, and the lens plate 4 is located to face the display panel 2 on the stage 33 at a predetermined height. In this state, the free end of the holding frame 34a is secured to the upper end section of the supporting plate 34b by securing members 44, and a securing end of the holding frame 34a is additionally secured by the multiple securing members 44.

As shown in FIG. 7, each of the securing members 44 is composed of a hold-down member 44a which abuts on the holding frame 34a to hold down the holding frame 34a, a rotation shaft 44b fixed to the hold-down member 44a, and a driving section 44c which causes the rotation shaft 44b to move in the Z direction and rotate in the θ direction. These securing members 44 are provided inside the depressurization chamber 32. Among the securing members 44, the hold-down member 44a moves in the θ direction and downward in the Z-axis direction (in FIG. 7) via the rotation shaft 44b to a securing position in which the holding frame 34a is to be secured. In addition, among the securing members 44, the hold-down member 44a moves upward in the Z-axis direction (in FIG. 7) and in the A direction via the rotation shaft 44b to a stand-by position in which the holding frame 34a is released from the securing position. Note that, although a part of the driving section 44c protrudes to the outside of the depressurization chamber 32, the depressurization chamber 32 has been formed to maintain the hermeticity. A protruding portion of the driving section 44c is connected to the control unit 41 via a connecting wire, and thereby the driving section 44c is electrically connected to the control unit 41.

Returning to FIG. 7, a stage moving mechanism 35 is a moving mechanism which moves the stage 33 in the X, Y, Z, and θ directions (see FIGS. 6 and 7) from the outside of the depressurization chamber 32. The stage moving mechanism 35 is provided outside the depressurization chamber 32, and is electrically connected to the control unit 41. Note that the θ direction is the rotational direction in the X-Y plane in FIGS. 6 and 7.

The stage moving mechanism 35 includes multiple supporting columns 35a which enter in the depressurization chamber 32 to support the stage 33, a table 35b to which the supporting columns 35a are fixed, a table moving mechanism 35c which supports the table 35b and moves it in the X, Y, Z, and θ directions, multiple first bellows 35d installed between the depressurization chamber 32 and the table 35b so as to respectively encase supporting column 35a, i.e., to house the supporting column 35a, and multiple second bellows 35e installed between the table 35b and the rack 42 (i.e., a placement surface 42a of the rack 42 on which the table moving mechanism 35c is placed).

The supporting columns 35a are inserted in through holes 32a1 provided in the bottom surface of the first chamber 32, respectively, to support the stage 33. One end of each supporting columns 35a is fixed onto the lower surface of the stage 33, and the other end thereof is fixed onto the table 35b. The supporting columns 35a are formed in circular column shapes, for example.

The table 35b is stacked on the table moving mechanism 35c so as to be movable in the X, Y, Z, and θ directions. The table moving mechanism 35c moves the table 35b in the X, Y, Z, and θ directions, and moves the stage 33 in the X, Y, Z, and θ directions by use of the supporting columns 35a fixed onto the table 35b.

The first bellows 35d and the second bellows 35e are expansive pipes capable of expanding. The first bellows 35d are connected with the inside of the depressurization chamber via the through holes 32a1 communicating with the depressurization chamber 32, and the hermeticity is maintained. The second bellows 35e are connected with the inside of the depressurization chamber 32 via a communication pipe 35e1 communicating with the depressurization chamber 32, and the hermeticity is maintained. Note that, as the first bellows 35d and the second bellows 35e, expansive pipes made of metal, for example, are used, the metal having strength so as not to deform due to depressurization of the depressurization chamber 32.

When the depressurization of the depressurization chamber 32 progresses, the stage 33 may be pulled upward (in FIG. 7) to tilt the table 35b connected to the stage 33 via the supporting columns 35a. When the bonding is performed in this state, accuracy in the Z direction (gap direction), the X direction, and the θ direction may be affected to cause departure from acceptable ranges. By making the second bellows 35e communicate with the inside of the depressurization chamber 32 via the communication pipe 35e1, the table 35b can be pulled downward (in FIG. 7) at approximately the same force as the force pulling the stage 33 upward. Accordingly, the table 35b connected to the stage 33 via the supporting columns 35a can be prevented from tilting. As a result, unevenness of the gap can be suppressed, and moreover, the accuracy in the Z direction (gap direction), the X direction, and the θ direction can fall within the acceptable ranges. Note that the sizes and the number of the second bellows 35e are determined so as to be approximately the same as those of the force to pull the stage 33 upward.

The stage moving mechanism 35 moves the stage 33 in the X, Y, and θ directions, performs the positioning of the display panel 2 and the lens plate 4 (lenticular lens 4a), and further moves the display panel 2 in the Z-axis direction while performing fine adjustments in the X and θ directions to perform the bonding of the display panel 2 and the lens plate 4. That is, the stage moving mechanism 35 functions as a moving mechanism which performs movement operations for moving the display panel 2 and the lens plate 4 relatively to each other. As the movement operations, there are a positioning movement operation of performing the positioning of the lenticular lens 4a of the lens plate 4 and the display panel 2, a bonding movement operation of performing the bonding of the lens plate 4 and the display panel 2, and the like. Note that the positioning is performed based on the alignment marks (positioning marks) each provided on the end section of the display panel 2 and the end section of the lens plate 4 or based on the alignment chart (striped positioning chart having alignment marks) shown by an image display of the display panel 2. The alignment mark or the alignment chart is imaged by the imaging section 37.

As shown in FIG. 6, the chamber moving mechanism 36 is composed of a Z-axis movement mechanism 36a, which moves the second chamber 32b in the Z-axis direction, and an X-axis movement mechanism 36b, which moves the Z-axis movement mechanism 36a in the X-axis direction. The chamber moving mechanism 36 is electrically connected to the control unit 41. The chamber moving mechanism 36 moves the second chamber 32b to a retreat position when an operator mount the display panel 2 or the lens plate 4 on the stage 33 and the holding frame 34a, and further moves the second chamber 32b to a closing position, in which the depressurization chamber 32 is closed, when the bonding of the display panel 2 and the lens plate 4 are performed.

The imaging section 37 performs the imaging operation on the display panel 2 from a visual distance via the lens plate 4 to acquire an image (image including the alignment mark or the alignment chart). The imaging section 37 is provided on the imaging section moving mechanism 38 so as to be movable in the Z-axis direction (vertical direction in FIG. 7) which is the contacting/departing direction with respect to the stage 33, and is electrically connected to the control unit 41. As the imaging section 37, a CCD camera or the like is used, for example. The focusing of the imaging section 37 is performed by a vertical movement of the imaging section 37 using the imaging section moving mechanism 38, an autofocus function, and the like.

The imaging section moving mechanism 38 is a moving mechanism, which is provided on a supporting column 37a secured on the rack 42 so as to extend in the Z-axis direction and which moves the imaging section 37 in the Z-axis direction. The imaging section moving mechanism 38 is fixedly provided on the supporting column 37a, and is electrically connected to the control unit 41. As the imaging section moving mechanism 38, for example, a linear motor mechanism, a feed screw mechanism, or the like is used. Note that the imaging section 37 is provided on the imaging section moving mechanism 38 with a supporting member 37b such as an arm member interposed in between.

The depressurization unit 39 includes a first suction pump 39a which discharges gas (atmosphere) such as air in the depressurization chamber 32, a second suction pump 39b which applies an adsorption force to the holding frame 34a, a third suction pump 39c which applies an adsorption force to the stage 33, and the like (see FIG. 7). The first suction pump 39a discharges atmosphere from the depressurization chamber 12 via a discharge pipe 39a1 communicating with the depressurization chamber 32. The second suction pump 39b discharges atmosphere from each adsorption groove 34a1 via a discharge pipe 39b1 communicating with the adsorption groove 34a1 (see FIG. 8) of the holding frame 34a. The third suction pump 39c discharges atmosphere from each adsorption groove 33b via a discharge pipe 39c1 communicating with the adsorption groove 33b (see FIG. 8) of the stage 33. The first suction pump 39a, the second suction pump 39b, and the third suction pump 39c are electrically connected to the control unit 41, and are driven in accordance with the control of the control unit 41.

The irradiation heads 40 are each provided on the second chamber 32b so as to be located on a frame-shaped line avoiding a window M of the second chamber 32b. The window M of the second chamber 32b is formed on the second chamber 32b by use of a transparent member such as glass, for example, to allow the imaging section 37 to perform imaging. The irradiation heads 40 irradiate light onto the adhesive member 3 located between the display panel 2 and the lens plate 4 in the coherent state, and partially cures the adhesive member 3 (as a temporary cure). At this time, light emitted from the irradiation heads 40 pass through the through holes 34a2 of the holding frame 34a to reach the adhesive member 3.

The control unit 41 includes a controller which collectively controls the sections, a storage section which stores various programs, various data, and the like, and an operation section which receives input operations from an operator (all not shown). The storage section has a random access memory (RAM) which functions as a work area of the controller, a volatile memory, and the like. The control unit 41 performs control of the sections based on the various programs, the various data, and the like stored in the storage section. Particularly, the control unit 41 executes a series of data processes of performing calculation, processing, and the like of data, a bonding process for bonding the display panel 2 and the lens plate 4, and the like. The bonding process includes a positioning process for positioning (including an imaging process for imaging), a depressurization process for depressurization, and the like. Note that the storage section stores an imaging condition, a bonding condition (including a depressurization condition), and the like. The operation section is provided with various buttons such as a panel adsorption button, a lens adsorption button, a start button, and the like.
(Manufacturing Method of Three Dimensional Image Display Device)

Next, a method (bonding method) of manufacturing the display device 1A using the manufacturing apparatus 31 described above will be described. Note that the control unit 41 of the manufacturing apparatus 31 executes the bonding process and controls the sections. In an initial state, the second chamber 32b of the depressurization chamber 32 is in the retreat position (i.e., the depressurization chamber 32 is in the opened state), and the holding frame 34a is also in the opened state (see FIG. 8).

Figure 9:
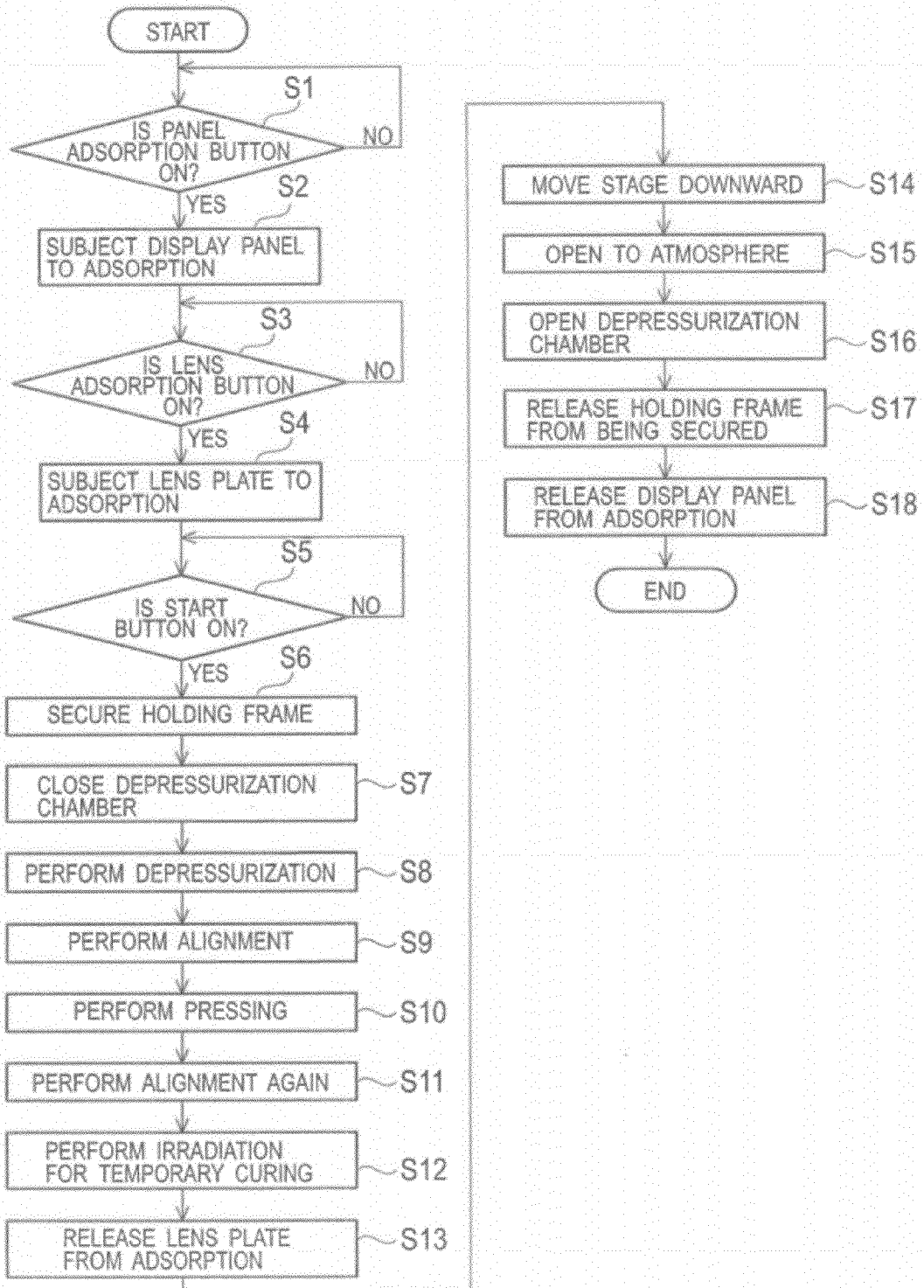
FIG. 9 is a flowchart showing the flow of a bonding process performed by the manufacturing apparatus shown in FIG. 6.

As shown in FIG. 9, the control unit 41 first judges whether or not the panel adsorption button is pressed (step S1) to wait for the pressing of the panel adsorption button (NO in step S1). An operator places the display panel 2 on the stage 33 with the holding frame 34a in the opened state (see FIG. 8), and presses the panel adsorption button.

If the control unit 41 judges that the panel adsorption button is pressed (YES in step S1), the third suction pump 39c is driven, and the display panel 2 is subjected to adsorption (step S2). Accordingly, the display panel 2 is secured to the stage 33. Note that, when an alignment chart shown in the image display of the display panel 2 is used in performing the positioning, a transmission line connected to the control unit 41 is connected to a driver circuit (signal interface) of the display panel 2 via a connector in this adsorption step, whereby the display panel 2 is electrically connected to the control unit 41.

Next, the control unit 41 judges whether or not the lens adsorption button is pressed (step S3) to wait for the pressing of the lens adsorption button (NO in step S3). The operator places the lens plate 4 on the holding frame 34a with the holding frame 34a in the opened state (see FIG. 8), and presses the lens adsorption button.

If the control unit 41 judges that the lens adsorption button is pressed (YES in step S3), the second suction pump 39b is driven, and the lens plate 4 is subjected to adsorption (step S4). Accordingly, the lens plate 4 is secured to the holding frame 34a.

Then, the control unit 41 judges whether or not the start button is pressed (step S5) to wait for the pressing of the start button (NO in step S5). The operator holds the handle 34a4, then revolves the holding frame 34a to cause the closed state (see FIG. 7), and presses the start button.

If the control unit 41 judges that the start button is pressed (YES in S5), the holding frame 34a is secured by the securing members 44 (step S6); the second chamber 32b of the depressurization chamber 32 is caused to move by the chamber moving mechanism 36 to close the depressurization chamber 32 (step S7); the first suction pump 39a is driven; atmosphere in the depressurization chamber 12 is discharged via the discharge pipe 39a1 communicating with the depressurization chamber 32; and the depressurization of the depressurization chamber 32 is performed until the pressure reaches a predetermined vacuum pressure (step S8).

Then, the control unit 41 causes the stage moving mechanism 35 to move the stage 33 (first movement of the stage 33) in the X, Y, and θ directions with the holding frame 34a in the closed state, and then causes the display panel 2 to move relatively to the lens plate 4 to perform the positioning (alignment) of the display panel 2 and the lenticular lens 4a in the planar direction (step S9). At this time, the control unit 41 causes the imaging section moving mechanism 38 to move the imaging section 37 to an imaging position; causes the light irradiation section 43 to irradiate light for imaging on the display panel 2; causes the imaging section 37 to acquire an image; and then performs the positioning by use of the acquired image. Here, the positioning of the display panel 2 and the lens plate 4 is performed such that the difference in the relative positions between the display panel 2 and the lenticular lens 4a in the planar direction falls within an acceptable range (for example, a range of several μm plus or minus a desired value).

Next, the control unit 41 causes the stage moving mechanism 35 to move the stage 33 (second movement of the stage 33) upward (in FIG. 7) in the Z-axis direction with the holding frame 34a in the closed state; pressurizes the display panel 2 toward the lens plate 4 (step S10); again performs the positioning (alignment) of the display panel 2 and the lenticular lens 4a in the planar direction (step S11) in a similar manner to that described above; and causes the irradiation heads 40 to perform the irradiation for curing (step S12). Accordingly, the continuous frame-shaped adhesive member 3 is partially cured with the lens plate 4 and the display panel 2 in the coherent state.

Then, the control unit 41 stops driving the second suction pump 39b to release the lens plate 4 from the adsorption (step S13); causes the stage moving mechanism 35 to move the stage 33 downward in the Z-axis direction (in FIG. 7) (step S14); causes the imaging section moving mechanism 38 to move the imaging section 37 to the retreat position; stops driving the first suction pump 39a to open the depressurization chamber 12 to atmosphere (step S15); causes the chamber moving mechanism 36 to move the second chamber 32b of the depressurization chamber 32 to the retreat position to open the depressurization chamber 32 (step S16); releases the holding frame 34a from being secured by the securing members 44 (step S17); and finally stops driving the third suction pump 39c to release the display panel 2 from the adsorption (step S18).

In this manner, the display panel 2 and the lens plate 4 are bonded in reduced-pressure atmosphere, and the inner space N formed by the display panel 2, the adhesive member 3, and the lens plate 4 is hermetically sealed at a pressure lower than the atmospheric pressure, so that the display device 1A shown in FIG. 1 is completed. At this time, the hermeticity of the inner space N of the display device 1A is maintained. Subsequently, the display device 1A is transferred from the stage 33 to a device for full curing by a person such as an operator or a machine such as robot, and then the adhesive member 3 therein is fully cured.

In such manufacturing steps, the display panel 2 and the lens plate 4 need to be bonded such that the vertical distance L (see FIG. 1), which is the spaced distance between the convex section (lens end) of the lenticular lens 4a and the color filter F, falls within the acceptable range (for example, a range of several tens of μm plus or minus a desired value), i.e., such that the gap as the spaced distance between the convex section of the lenticular lens 4a and the display panel 2 is eliminated. If the gap increases, the vertical distance L falls outside the acceptable range and the error in viewing angle also falls outside the acceptable range (for example, outside a range of a desired value plus or minus several tens of μm). Accordingly, the display quality of a three dimensional image is degraded.

In the manufacturing steps described above, the display panel 2 and the lens plate 4 are bonded in a reduced-pressure atmosphere. Accordingly, the inner space N formed by the display panel 2, the adhesive member 3, and the lens plate 4 becomes in the hermetic state in which the internal pressure thereof is lower than the atmospheric pressure to cause the convex section of the lenticular lens 4a and the display panel 2 (polarizer 2c) to be completely coherent. Since the coherent state is maintained, there is no gap and the vertical distance L falls within the acceptable range. As a result, the error in viewing angle can fall within the acceptable range, whereby the degrading of the display quality of a three dimensional image can be prevented. Particularly, a change of the gap caused by a bend due to a dead weight, partial pressure application from outside, an increase in an ambient temperature, or the like can be prevented even after manufacture, whereby the vertical distance L can be maintained within the acceptable range.

As described above, the second embodiment of the present invention provides the depressurization chamber 32, the stage 33 provided in the depressurization chamber 32, the supporter 34 which is provided in the depressurization chamber 32 and supports the lens plate 4 so as to face the stage 33, the stage moving mechanism 35 which moves the stage 33 from the outside of the depressurization chamber 32, a depressurization unit 39 which depressurizes the depressurization chamber 32, and the control unit 41. The control unit 41 causes the stage moving mechanism 35 to perform the first movement of the stage 33 for the positioning between the display panel 2 placed on the stage 33 and the lens plate 4 supported by the supporter 34; causes the depressurization unit 39 to depressurize the depressurization chamber 32; and causes the stage moving mechanism 35 to perform the second movement of the stage 33 to press the display panel 2 on the stage 33 against the lens plate 4 supported by the stage moving mechanism 34. With this configuration, the lens plate 4 and the display panel 2 can be bonded in a reduced-pressure atmosphere with the continuous frame-shaped adhesive member 3 interposed in between while the lenticular lens 4a is arranged to face the display panel 2.

Accordingly, since the inner space N of the display device 1A becomes in the hermetic state in which the internal pressure thereof is lower than the atmospheric pressure, and the convex section of the lenticular lens 4a and the display panel 2 (polarizer 2c) become completely coherent, there is no gap as the spaced distance therebetween, and the vertical distance L falls within the acceptable range. As a result, the error in viewing angle certainly falls within the acceptable range. As described above, since the display panel 2 and the lens plate 4 can be bonded without forming a gap, and an increase of the vertical distance L, i.e., an increase of the error in viewing angle can be suppressed, the degrading of the display quality of a three dimensional image can be prevented. Particularly, formation of a gap is also prevented, which is possibly formed after manufacture due to a bend caused by a dead weight, partial pressure application from outside, an increase in an ambient temperature, or the like, even when the convex section of the lenticular lens 4a and the display panel 2 are completely coherent at the time of manufacture. Accordingly, the vertical distance L can be maintained within the acceptable range. Therefore, the error in viewing angle can certainly be kept within the acceptable range.

The stage moving mechanism 35 includes the supporting columns 35a which enter in the depressurization chamber 32 to support the stage 33, the table 35b to which the supporting columns 35a are fixed, the table moving mechanism 35c which supports and moves the table 35b, the first bellows 35d which are provided between the depressurization chamber 32 and the table 35b so as to encase each supporting column 35a and which communicate with the depressurization chamber 32, and the second bellows 35e which are provided between the table 35b and the placement surface 42a on which the table moving mechanism 35c is placed and which communicate with the depressurization chamber 32. With this configuration, the table moving mechanism 35c which possibly causes refuse, dust, and the like is located not within but outside the depressurization chamber 32 and, therefore a manufacturing defect caused by adhesion of the refuse, dust, and the like can be prevented. Further, since the second bellows 35e communicate with the depressurization chamber 32, the tilt of the table 35b due to depressurization can be suppressed. Accordingly, unevenness of the gap can be prevented and moreover, the gap can fall within the acceptable range.

By manufacturing the display device 1A using the manufacturing apparatus 31 described above, it becomes possible to keep the gap between the lenticular lens 4a of the lens plate 4 and the polarizer 2c of the display panel 2 within the acceptable range, and to keep the error in viewing angle within the acceptable range. Accordingly, the display device 1A having good display quality of a three dimensional image can easily be obtained.

Third Embodiment

A third embodiment of the present invention will be described with reference to FIGS. 10 to 15.

(Three Dimensional Image Display Device)

A three dimensional image display device (hereinafter referred to as "display device") 1B according to the third embodiment of the present invention basically has the same structure as the display device 1A according to the first embodiment. Thus, in the third embodiment, portions differing from the display device 1A according to the first embodiment will be described. Note that, in the third embodiment, descriptions of the same portions as the portions described in the first embodiment will be omitted.

Figure 10:
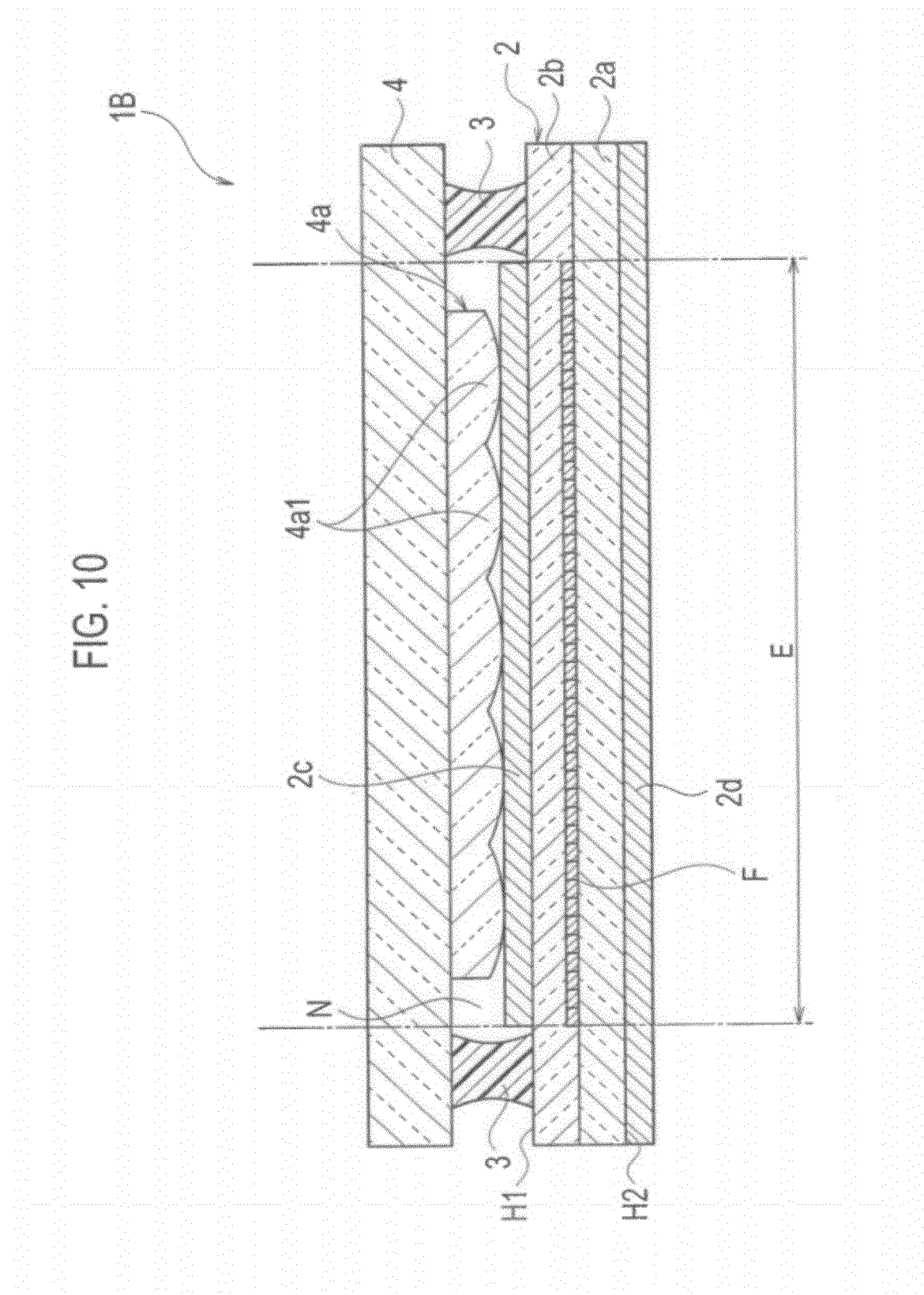
FIG. 10 is a cross-sectional view showing a schematic configuration of a display device according to a third embodiment of the present invention.

As shown in FIG. 10, in the display device 1B according to the third embodiment of the present invention, the internal pressure of the inner space N is the same as the atmospheric pressure. The second polarizer 2d is a member which is provided on a second surface H2 (a surface opposite to a first surface H1) on the opposite side of the lens plate 4 side of the display panel 2 and which covers the entire region of the second surface H2. That is, the second polarizer 2d is provided over the entire region of the second surface H2 including a display region E. Note that the first polarizer 2c is a member which is provided within the frame of the adhesive member 3 and on the first surface H1 on the lens plate 4 side of the display panel 2 and which covers only the display region E of being a region contributing to the display of the display panel 2, in a similar manner to the display device 1A according to the first embodiment.

(Apparatus for Manufacturing Three Dimensional Image Display Device)

Next, a manufacturing apparatus 51 for manufacturing the display device 1B described above will be described.

Figure 11:
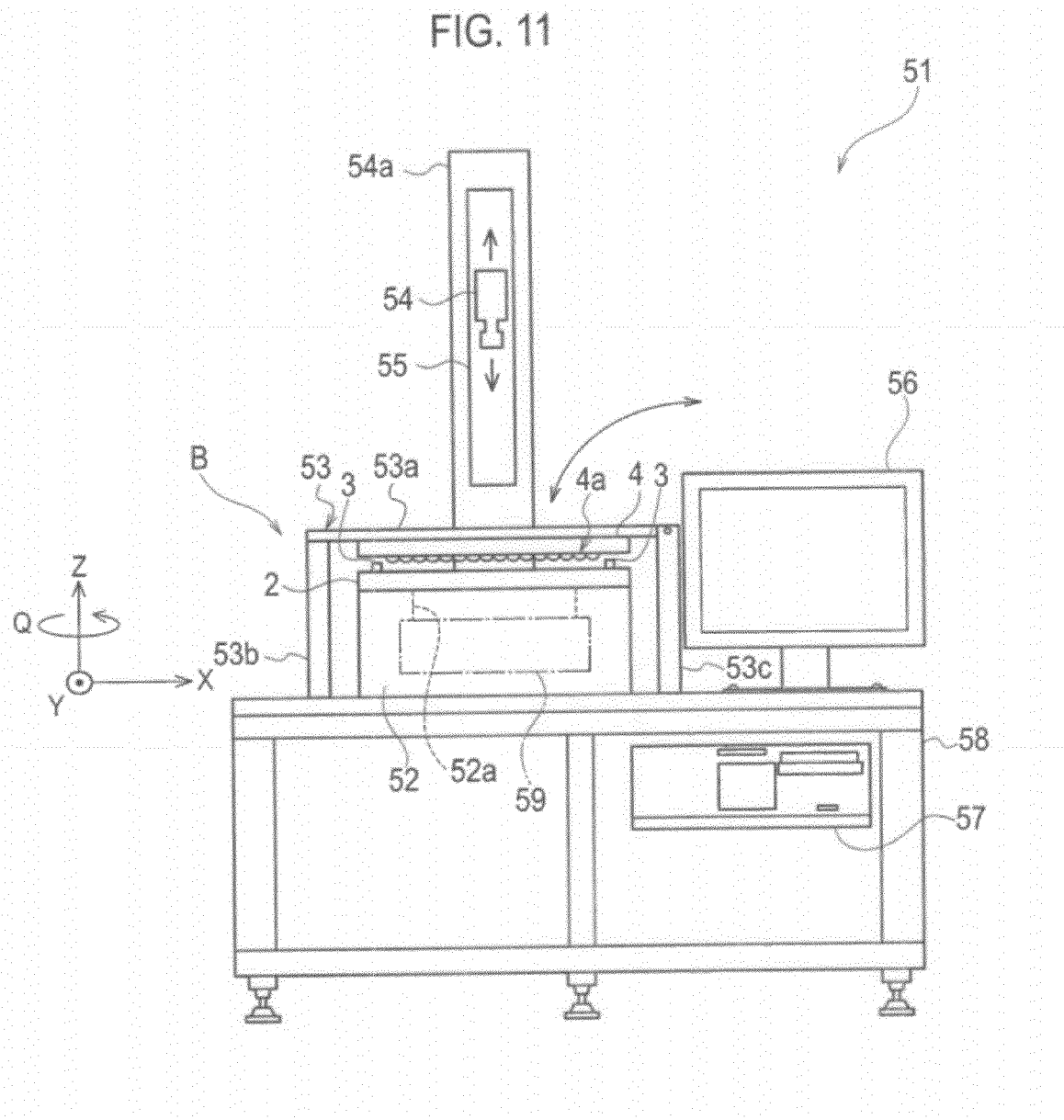
FIG. 11 is a schematic view showing a schematic configuration of an apparatus for manufacturing the display device according to the third embodiment of the present invention.

As shown in FIG. 11, the manufacturing apparatus 51 according to the third embodiment of the present invention includes a stage moving mechanism 52 which functions as a stage on which the display panel 2 is placed and which moves the placed display panel 2 in the X, Y, Z, and A directions, a supporter 53 which supports the lens plate 4 so as to face the stage moving mechanism 52 at a predetermined height, an imaging section 54 which performs imaging operations, an imaging section moving mechanism 55 which moves the imaging section 54 in the Z-axis direction (vertical direction in FIG. 11), a display section 56 which displays an image and the like imaged by the imaging section 54, and a control unit 57 which controls sections. These sections are provided on a rack 58.

The stage moving mechanism 52 functions as a stage which supports the display panel 2 by its own weight or a holding mechanism (for example, suction, electrostatic adsorption, and the like). The display panel 2 is placed on a holding surface of the stage moving mechanism 52. Note that the frame-shaped adhesive member 3 is applied to the bonding surface of the display panel 2 (see FIG. 12). In addition, the stage moving mechanism 52 also functions as a moving mechanism which moves the placed display panel 2 in the X, Y, Z, and θ directions (see FIG. 11). The stage moving mechanism 52 is provided on the rack 58, and is electrically connected to the control unit 57. Note that the θ direction is the rotational direction in the X-Y plane in FIG. 11.

Figure 13:
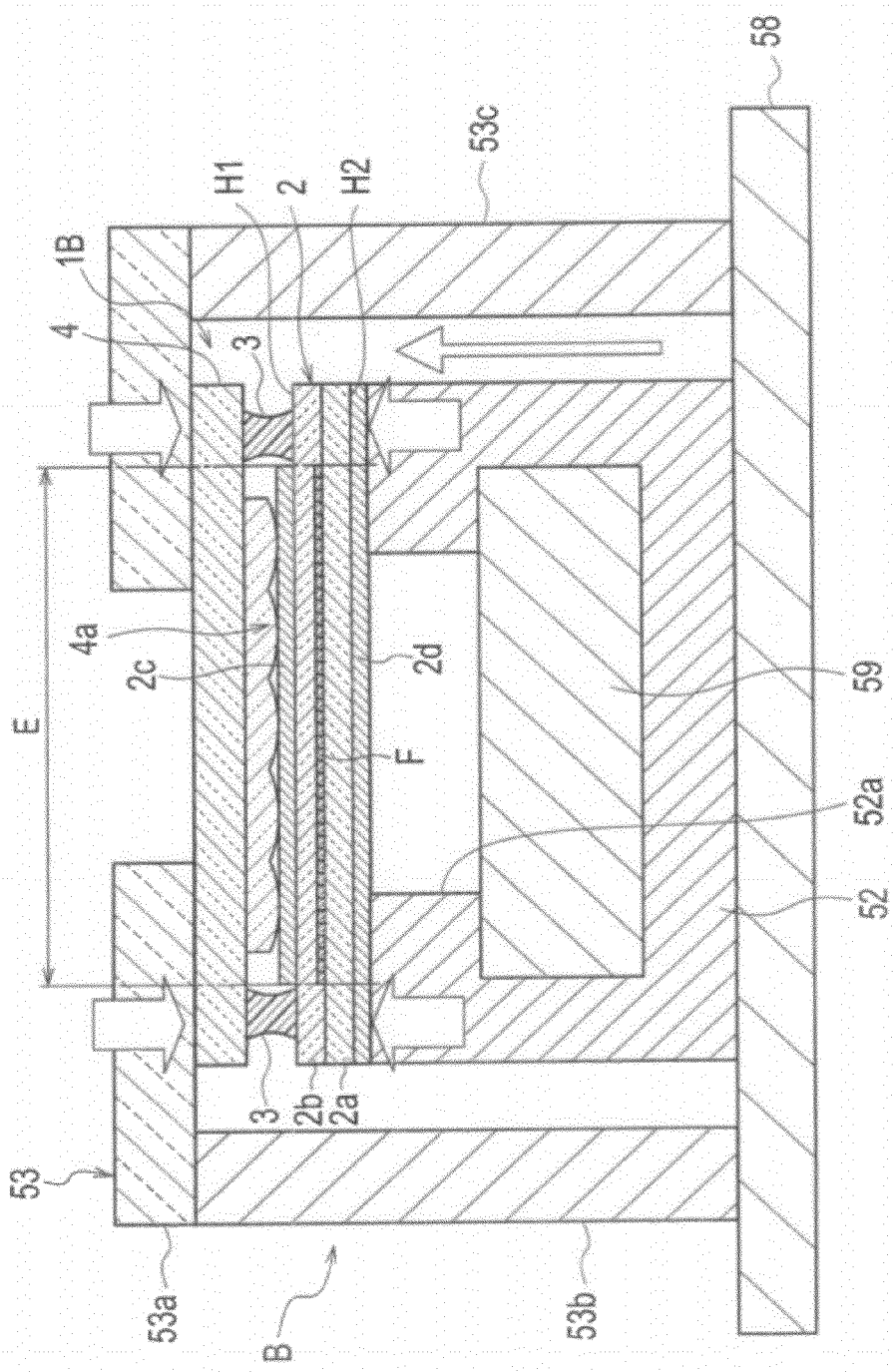
FIG. 13 is a cross-sectional view showing a bonding mechanism included in the manufacturing apparatus shown in FIG. 11.

The stage moving mechanism 52 moves the display panel 2 in the X, Y, and θ directions to perform the positioning of the display panel 2 and the lens plate 4 (lenticular lens 4a), and further moves the display panel 2 in the Z-axis direction to perform the bonding of the display panel 2 and the lens plate (see FIG. 13). That is, the stage moving mechanism 52 functions as the moving mechanism which performs movement operations for moving the display panel 2 and the lens plate 4 relatively. As the movement operations, there are the positioning movement operation of performing the positioning of the lenticular lens 4a of the lens plate 4 and the display panel 2, the bonding movement operation of performing the bonding of the lens plate 4 and the display panel 2, and the like. Note that the positioning is performed based on the alignment marks (positioning marks) each provided on the end section of the display panel 2 and the end section of the lens plate 4 or based on the alignment chart (striped positioning chart having alignment marks) shown by the image display of the display panel 2. The alignment mark or the alignment chart is imaged by the imaging section 54.

Inside the stage moving mechanism 52, a light irradiation section 59 such as a backlight which performs light irradiation is provided. The light irradiation section 59 turns on light for imaging of the alignment mark (alignment chart) when the display panel 2 and the lens plate 4 are to be bonded. The light irradiation section 59 is electrically connected to the control unit 57, and turns the light on and off in accordance with the control by the control unit 57. Note that an opening section 52a is formed, for example, in a rectangular shape to be located substantially in the center of the stage moving mechanism 52 and, therefore light emitted from the light irradiation section 59 enters the display panel 2 from the opening section 52a. The opening area of the opening section 52a is designed to have a size which enables light irradiation necessary for the imaging described above with respect to the display panel 2, and furthermore, is designed to have, at the time of bonding, the maximum abutting area where the stage moving mechanism 52 presses the display panel 2. Accordingly, the stage moving mechanism 52 supports an outer surface periphery region: opposite to the adhesive member 3, including an outer surface region of the display panel 2, i.e., of the polarizer 2d; and a periphery section of the display region E. Therefore, the stage moving mechanism 52 presses the outer surface periphery region at the time of the bonding (see FIG. 13).

The supporter 53 is composed of a holding frame 53a which holds the lens plate 4 in a detachable manner, and a pair of supporting plates 53b and 53c which support the holding frame 53a at a predetermined height with respect to the stage moving mechanism 52. The holding frame 53a holds the periphery of the lens plate 4 by using a holding mechanism (for example, suction, electrostatic adsorption, and the like). The holding frame 53a is made of a material having transparency, such as for example, a transparent material (for example, acrylic resin and the like), so as not to prevent the imaging section 54 from performing imaging. The pair of supporting plates 53b and 53c are arranged in positions opposite to each other with the stage moving mechanism 52 interposed in between, and are secured on the rack 58. Note that the holding frame 53a is rotatably provided on an upper end section of the supporting plate 53c. A free end of the holding frame 53a with the lens plate 4 held abuts on an upper end section of the supporting plate 53b, and the lens plate 4 is located at a predetermined height so as to face the display panel 2 on the stage moving mechanism 52. In this state, the free end of the holding frame 53a is secured to the upper end section of the supporting plate 53b by a securing member such as a screw, and then the bonding of the lens plate 4 and the display panel 2 is performed.

In the bonding, as shown in FIG. 13, the stage moving mechanism 52 causes the display panel 2 to move toward the lens plate 4 held by the supporter 53. Accordingly, the display panel 2 on the stage moving mechanism 52 approaches the lens plate 4; the frame-shaped adhesive member 3 is crushed;

the first polarizer 2c of the display panel 2 and the lenticular lens 4a of the lens plate 4 coherently abut on each other; and the display panel 2 and the lens plate 4 are bonded. Thus, the stage moving mechanism 52 and the supporter 53 function as a bonding mechanism B.

Particularly, the bonding mechanism B performs the bonding in a manner that: the display panel 2 and the lens plate 4 are relatively moved in an approaching direction, with the adhesive member 3 interposed in between, while the lenticular lens 4a is arranged to face the first surface H1 of the display panel 2; a pressure is directly applied to the outer surface region of the lens plate 4 opposite to the adhesive member 3 to press the adhesive member 3 from the lens plate 4 side; and a pressure is directly applied to the outer surface region of the second polarizer 2d opposite to the adhesive member 3 to press the adhesive member 3 from the display panel 2 side.

Note that the holding frame 53a of the supporter 53 functions as a pressing member which directly applies a pressure to the outer surface region of the lens plate 4 opposite to the adhesive member 3 to press the adhesive member 3 from the lens plate 4 side. The stage moving mechanism 52 functions as a moving mechanism, which causes the display panel 2 to approach the holding frame 53a and directly applies a pressure to the outer surface region of the second polarizer 2d opposite to the adhesive member 3 to press the adhesive member 3 from the display panel 2 side. The stage moving mechanism 52 supports the outer surface periphery region including the outer surface region opposite to the adhesive member 3, of the second polarizer 2d. The stage moving mechanism 52 includes the opening section 52a which faces an outer surface center region located within the outer surface periphery region, and the light irradiation section 59 which irradiates light onto the display panel 2 from the opening section 52a.

The imaging section 54 performs the imaging operation from a visual distance with respect to the display panel 2 via the lens plate 4 to acquire an image (image including the alignment mark or alignment chart). The imaging section 54 is provided on the imaging section moving mechanism 55 so as to be movable in the Z-axis direction (vertical direction in FIG. 11) which is the contacting/departing direction with respect to the stage moving mechanism 52, and is electrically connected to the control unit 57. As the imaging section 54, a CCD camera or the like is used, for example. The focusing of the imaging section 54 is performed by a vertical movement of the imaging section 54 using the imaging section moving mechanism 55, an autofocus function, and the like.

The imaging section moving mechanism 55 is a moving mechanism, which is provided on a supporting column 54a secured on the rack 58 so as to extend in the Z-axis direction and which moves the imaging section 54 in the Z-axis direction. The imaging section moving mechanism 55 is fixedly provided on the supporting column 54a, and is electrically connected to the control unit 57. As the imaging section moving mechanism 55, for example, a linear motor mechanism, a feed screw mechanism, or the like is used. Note that the imaging section 54 is provided on the imaging section moving mechanism 55 with a supporting member such as an arm member interposed in between.

The display section 56 displays images and the like imaged by the imaging section 54. The display section 56 is provided on the rack 58, and is electrically connected to the control unit 57. Note that, as the display section 56, a liquid crystal display, a cathode ray tube (CRT) display, or the like is used, for example.

The control unit 57 includes a controller which collectively controls the sections and a storage section which stores various programs, various data, and the like (both not shown). The storage section has a random access memory (RAM) which functions as a work area of the controller, a nonvolatile memory, and the like. The control unit 57 performs control of the sections based on the various programs, the various data, and the like stored in the storage section. Particularly, the control unit 57 executes a series of data processes of performing calculation, processing, and the like of data, a bonding process for bonding the display panel 2 and the lens plate 4, and the like. The bonding process includes a positioning process for positioning (including an imaging process for imaging), a depressurization process for depressurization, and the like. Note that the storage section stores an imaging condition, a bonding condition, and the like.

Next, a method (bonding method) of manufacturing the display device 1B using the manufacturing apparatus 51 described above will be described. Note that the control unit 57 of the manufacturing apparatus 51 executes the bonding process and controls the sections. At this time, the display panel 2 to which the frame-shaped adhesive member 3 is applied is placed on the stage moving mechanism 52, and the lens plate 4 is present in a predetermined position with respect to the display panel 2 on the stage moving mechanism 52 with the holding frame 53a in the closed state (see FIGS. 11 and 12).

Figure 14:
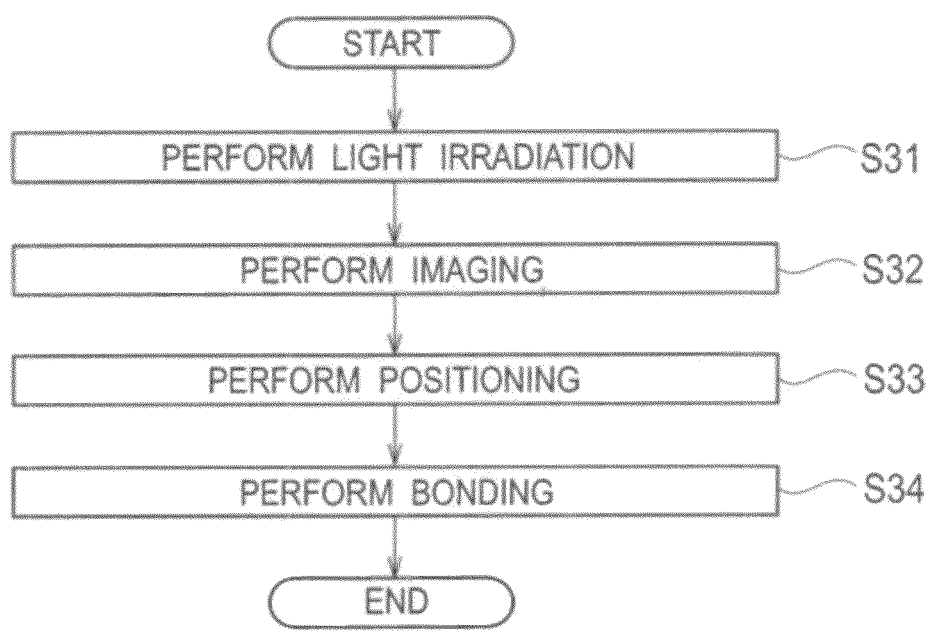
FIG. 14 is a flowchart showing the flow of a bonding process performed by the manufacturing apparatus shown in FIG. 11.

As shown in FIG. 14, the control unit 57 first performs light irradiation (step S31). That is, the control unit 57 causes the light irradiation section 59 to execute an irradiation operation with the holding frame 53a in the closed state. Here, the irradiation operation is an operation in which light for imaging is irradiated onto the display panel 2.

Next, the control unit 57 performs the imaging in a light irradiation state (step S32). That is, the control unit 57 causes the stage moving mechanism 52 to move the display panel 2 to a predetermined position for imaging with respect to the lens plate 4 with the holding frame 53a in the closed state, and causes the imaging section 54 to execute the imaging operation. Here, the imaging operation is an operation of performing the imaging with respect to the display panel 2 on the stage moving mechanism 52 via the lens plate 4.

Figure 12:
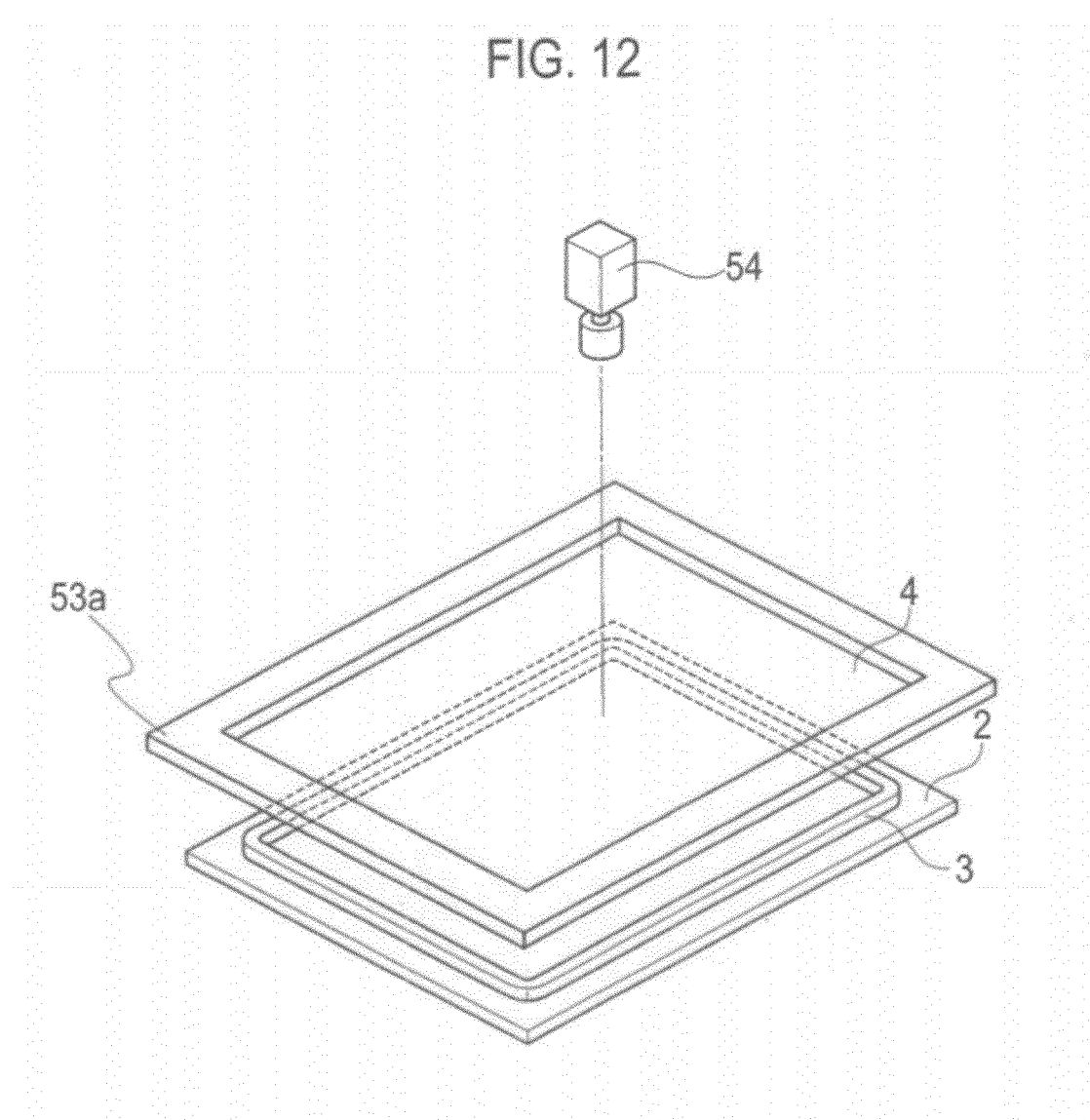
FIG. 12 is an illustrative view for illustrating positioning operations of the manufacturing apparatus shown in FIG. 11.

As shown in FIGS. 11 and 12, the closed state of the holding frame 53a causes the lens plate 4 to be located between the display panel 2 on the stage moving mechanism 52 and the imaging section 54 and to be located close proximity to the display panel 2, and the imaging operation is performed by the imaging section 54 in this state. At this time, the lenticular lens 4a of the lens plate 4 is located on the display panel 2 side. An image is obtained by the imaging operation of the imaging section 54, and is displayed in the display section 56.

Next, the control unit 57 performs the positioning based on the obtained image (step S33). That is, the control unit 57 calculates the displacement amount from the obtained image based on the alignment marks or the alignment chart by performing image processing, and causes the stage moving mechanism 52 to execute the positioning movement operation so as to eliminate the calculated displacement amount. Accordingly, the display panel 2 on the stage moving mechanism 52 slides and rotates by the amount of the displacement so that the positioning of the lenticular lens 4a and the display panel 2 in the planar direction is completed.

Then, the control unit 57 performs the bonding (step S34) upon completion of the positioning. That is, when the positioning is completed, the control unit 57 causes the stage moving mechanism 52 to execute the bonding movement operation. Accordingly, the display panel 2 on the stage moving mechanism 52 approaches the lens plate 4; the frame-shaped adhesive member 3 is crushed; the first polarizer 2c of the display panel 2 and the lenticular lens 4a of the lens plate 4 coherently abut on each other; and the bonding of the display panel 2 and the lens plate 4 is completed (see FIG. 13).

Finally, light for curing is irradiated onto the adhesive member 3 and, therefore the adhesive member 3 is cured. Then, the display device 1B is transferred from the stage moving mechanism 52 to a device for full curing by a person such as an operator or a machine such as a robot, and then the adhesive member 3 (including the adhesive member 3a) therein is fully cured.

Here, the display panel 2 and the lens plate 4 need to be bonded such that the vertical distance, which is the spaced distance between the convex section (lens end) of the lenticular lens 4a and the color filter F, falls within the acceptable range (for example, a range of several tens of μm plus or minus a desired value), i.e., such that the gap as the spaced distance between the convex section of the lenticular lens 4a and the display panel 2 falls within the acceptable range (for example, a range of several tens of μm plus or minus a desired value). If the gap increases, the vertical distance falls outside the acceptable range and the error in viewing angle also falls outside the acceptable range (for example, outside a range of a desired value plus or minus several tens of μm). Accordingly, the display quality of a three dimensional image is degraded.

Figure 15:
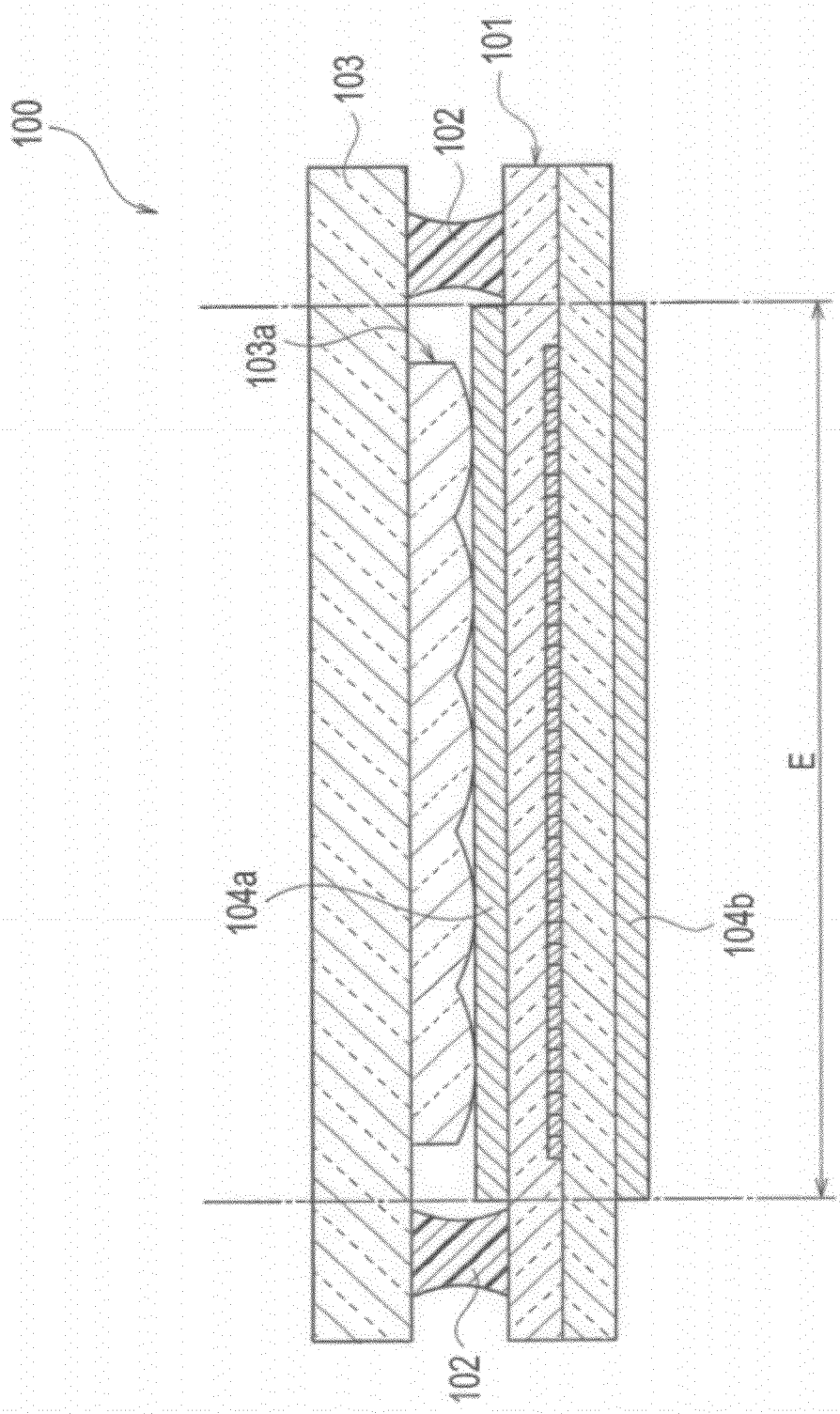
FIG. 15 is a cross-sectional view showing a schematic configuration of a display device of a comparative example.

As shown in FIG. 15, a display device 100 which displays a three dimensional image includes a display panel 101 which displays an image, and a lens plate 103 provided on the display panel 101 with a frame-shaped adhesive member 102 interposed in between. The lens plate 103 has a lenticular lens 103a on the display panel 101 side. Two polarizers 104a and 104b are provided on the outer surfaces of the display panel 101, respectively, so as to be opposed to each other with the display panel 101 interposed in between. Further, the polarizers 104a and 104b are provided only in a region contributing to the display of the display panel 101, i.e., in the display region E on the display panel 101. Accordingly, the amount of material used for the polarizer 104b is decreased and, therefore the material cost and the like is reduced. When the lens plate 103 is provided on the display panel 101, the lens plate 103 is placed on the display panel 101, and, in the placed state, the display panel 101 and the lens plate 103 are coherently bonded by pressing them in each direction for coherence therebetween. Note that the display panel 101 is provided on the stage.

However, as shown in FIG. 15, since the polarizer 104b is provided only on the display region E, the polarizer 104b does not exist in an outer surface region of the display panel 101 opposite to the adhesive member 102, i.e., an outer surface region located below the adhesive member 102 (in FIG. 15) and, therefore a gap is formed between the display panel 101 and the stage. Therefore, when the display panel 101 and the lens plate 103 are bonded, a pressure is not directly applied to the outer surface region opposite to the adhesive member 102 and, therefore the adhesive member 102 is not easily crushed. Accordingly, the polarizer 104a of the display panel 101 and the lenticular lens 103a of the lens plate 103 do not become completely coherent so that the gap (spaced distance) may be formed therebetween. If the gap does not fall within the acceptable range (for example, a range of several tens of μm plus or minus a desired value), the error in viewing angle also falls outside the acceptable range. Accordingly, the display quality of a three dimensional image is degraded.

In the bonding process described above, since the polarizer 2d is provided on the second surface H2 of the display panel 2 so as to cover the entire region of the second surface H2 (see FIGS. 10 and 13), the second polarizer 2d is present also in the position (outer surface region) opposite to the adhesive member 3 unlike in the display device 100 described above (see FIG. 15). Therefore, the gap is not formed between the outer surface region of the second polarizer 2d opposite to the adhesive member 3 and the stage moving mechanism 52 as shown in FIG. 13. Accordingly, when the display panel 2 and the lens plate 4 are bonded, a pressure is directly applied to the outer surface region of the second polarizer 2d opposite to the adhesive member 3 to favorably crush the adhesive member 3 so that the first polarizer 2c of the display panel 2 and the lenticular lens 4a of the lens plate 4 become completely coherent to suppress the formation of the gap (spaced distance) therebetween. As a result, the gap falls within the acceptable range and the vertical distance falls within the acceptable range and, therefore the error in viewing angle falls within the acceptable range.

As described above, in the third embodiment, since the second polarizer 2d is provided on the second surface H2 of the display panel 2 so as to cover the entire second surface H2 (see FIGS. 10 and 13), the second polarizer 2d is present also in the position (outer surface region) opposite to the adhesive member 3 unlike in the display device 100 described above (see FIG. 15) even when the display device 1B is placed on the stage moving mechanism 52, so that the gap is not formed between the outer surface region of the second polarizer 2d opposite to the adhesive member 3 and the stage moving mechanism 52 as shown in FIG. 13. Accordingly, when the display panel 2 and the lens plate 4 are bonded, a pressure is directly applied to the outer surface region of the second polarizer 2d opposite to the adhesive member 3 to favorably crush the adhesive member 3 and, therefore the first polarizer 2c of the display panel 2 and the lenticular lens 4a of the lens plate 4 become completely coherent to suppress the formation of the gap (spaced distance) therebetween. As a result, the gap falls within the acceptable range and the error in viewing angle can be kept within the acceptable range, so that the degrading of the display quality of a three dimensional image can be prevented.

The bonding mechanism B performs the bonding: by moving the display panel 2 and the lens plate 4 relatively to each other in the approaching direction with the adhesive member 3 interposed in between while the lenticular lens 4a is arranged to face the first surface H1 of the display panel 2; by applying a pressure directly to the outer surface region of the lens plate 4 opposite to the adhesive member 3 to press the adhesive member 3 from the lens plate 4 side; and by applying a pressure directly to the outer surface region of the second polarizer 2d opposite to the adhesive member 3 to press the adhesive member 3 from the display panel 2 side. Accordingly, the pressure is directly applied to the outer surface region of the second polarizer 2d opposite to the adhesive member 3 to favorably crush the adhesive member 3. As a result, the first polarizer 2c of the display panel 2 and the lenticular lens 4a of the lens plate become completely coherent to certainly suppress the formation of the gap (spaced distance) therebetween.

Note that, when the opening area of the opening section 52a of the stage moving mechanism 52 is made larger than necessary, the supporting area for supporting the display panel 2 decreases so that the display panel 2 is bent. This may cause a gap between the first polarizer 2c and the lenticular lens 4a. Thus, the opening area of the opening section 52a is designed to have a size which allows light necessary for the imaging to be irradiated on the display panel 2, and moreover, to have the maximum area of the pressing of the display panel 2 in bonding. The bend of the display panel 2 can be suppressed in this manner.

By manufacturing the display device 1B by use of the manufacturing apparatus 51 including the bonding mechanism B described above, it becomes possible to keep the gap between the first polarizer 2c of the display panel 2 and the lenticular lens 4a of the lens plate 4 within the acceptable range, and to keep the error in viewing angle within the acceptable range. Therefore, the display device 1B having good display quality of a three dimensional image can easily be obtained.

Fourth Embodiment

A fourth embodiment of the present invention will be described with reference to FIGS. 16 to 24.

A three dimensional image display device (hereinafter referred to as "display device") according to the fourth embodiment of the present invention has the same structure as the display device 1B according to the third embodiment. A manufacturing apparatus for the display device according to the fourth embodiment of the present invention has the same structure as the manufacturing apparatus 51 of the display device according to the third embodiment of the present invention. Thus, in the fourth embodiment, portions different from the first embodiment will be described. Note that, in the fourth embodiment, descriptions of the same portions as the portions described in the third embodiment will be omitted.

In the fourth embodiment, a method (bonding method) of manufacturing the display device 1B using the manufacturing apparatus 51 described above will be described. Note that the control unit 57 of the manufacturing apparatus 51 executes the bonding process to control other sections. At this time, the display panel 2 is placed on the stage moving mechanism 52, and the lens plate 4 is present in the predetermined position with respect to the display panel 2 on the stage moving mechanism 52, with the holding frame 53a in the closed state (see FIGS. 11 and 12).

Figure 16:
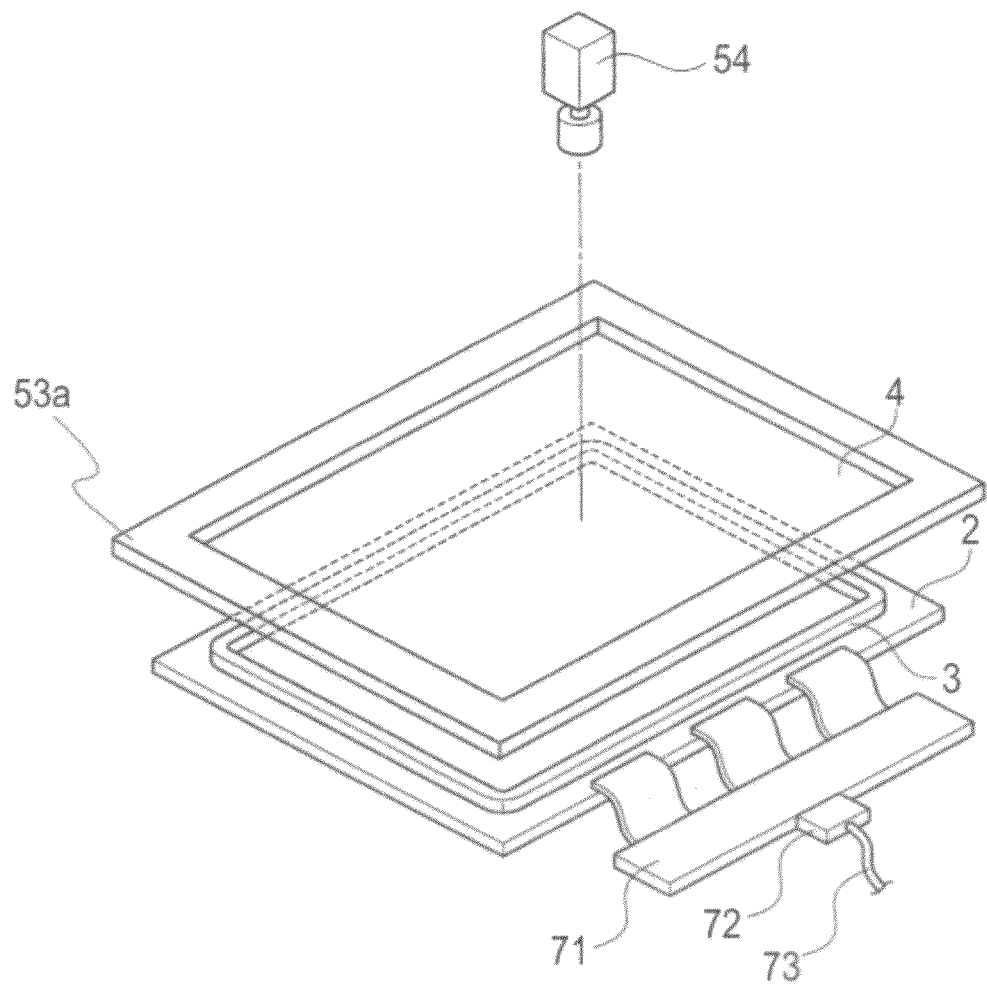
FIG. 16 is an illustrative view for illustrating the electrical connection between a display panel and an apparatus for manufacturing a display device according to a fourth embodiment of the present invention.

In order for the display panel 2 to display a bonding image G1 as an image for gap control (see FIG. 18), the display panel 2 and the control unit 57 are electrically connected to each other. As shown in FIG. 16, the display panel 2 is provided with a signal interface 71. A transmission line 73 is connected to the signal interface 71 via a connector section 72. The transmission line 73 is a line which is connected to the control unit 57 and which transmits an alignment chart signal (bonding image G1) generated by the control unit 57 to the signal interface 71 of the display panel 2. The connector section 72 is formed so as to be detachable from the signal interface 71 and is provided on one end of the transmission line 73. Note that the control unit 57 functions as a generating section which generates the alignment chart signal.

Figure 17:
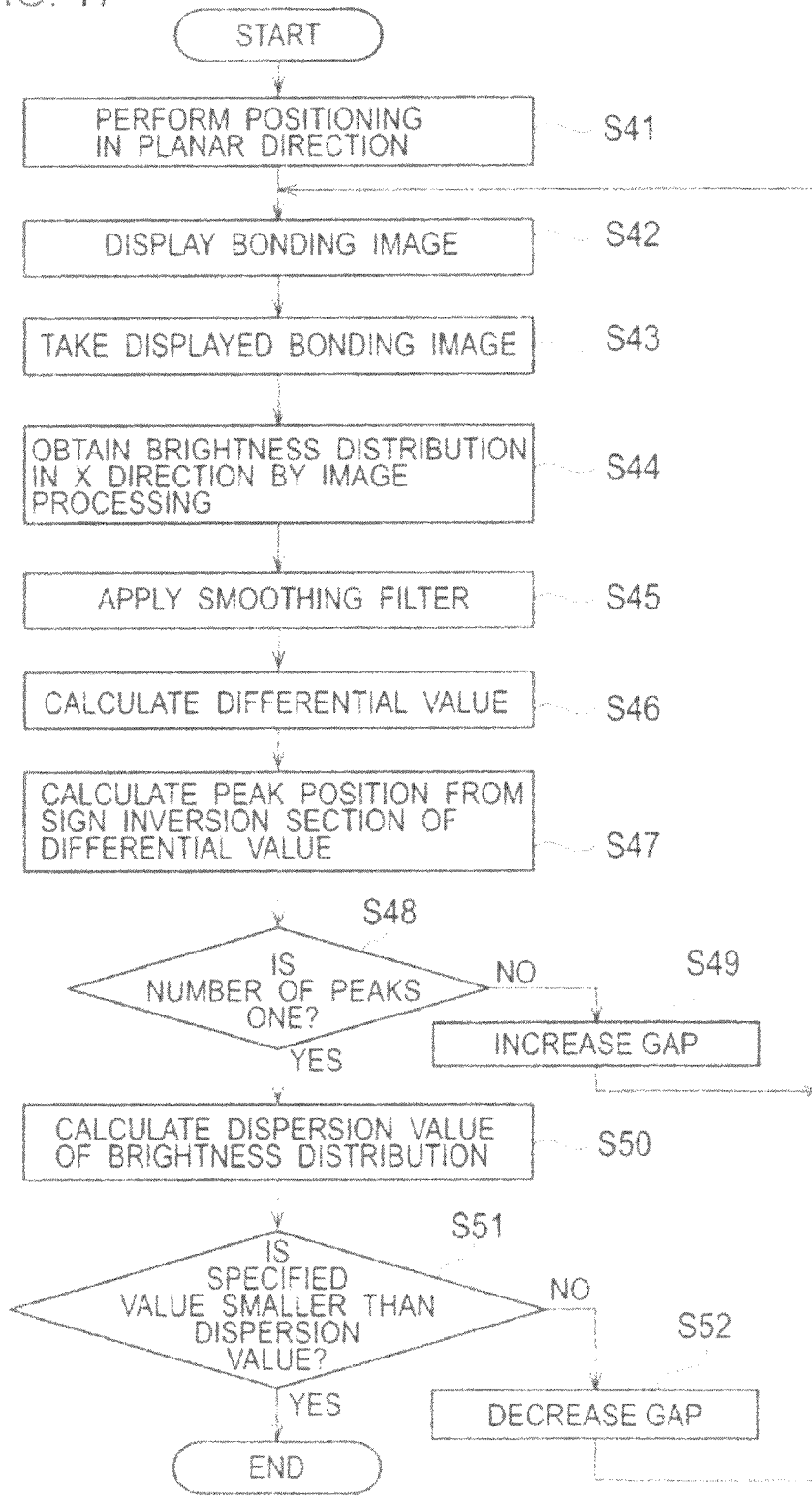
FIG. 17 is a flowchart showing the flow of a bonding process performed by the apparatus for manufacturing the display device according to the fourth embodiment of the present invention.

As shown in FIG. 17, the control unit 57 first performs the positioning of the display panel 2 and the lenticular lens 4a in the planar direction (step S41). That is, the control unit 57 causes the stage moving mechanism 52 to move the display panel 2 relatively to the lens plate 4 to perform the positioning in the planar direction, with the holding frame 53a in the closed state. Here, the positioning of the display panel 2 and the lens plate 4 is performed such that the relative position displacement between the display panel 2 and the lenticular lens 4a in the planar direction falls within the acceptable range (for example, a range of several μm plus or minus a desired value).

Then, the control unit 57 causes the display panel 2 to display the bonding image G1 which functions as an image for gap control (see FIG. 18) (step S42). That is, the control unit 57 causes the light irradiation section 59 to execute the irradiation operation, and causes the display panel 2 to display the bonding image G1. The irradiation operation is an operation of irradiating the display panel 2 with light for image display. Note that data of the bonding image G1 is stored in the storage section.

Figure 18:
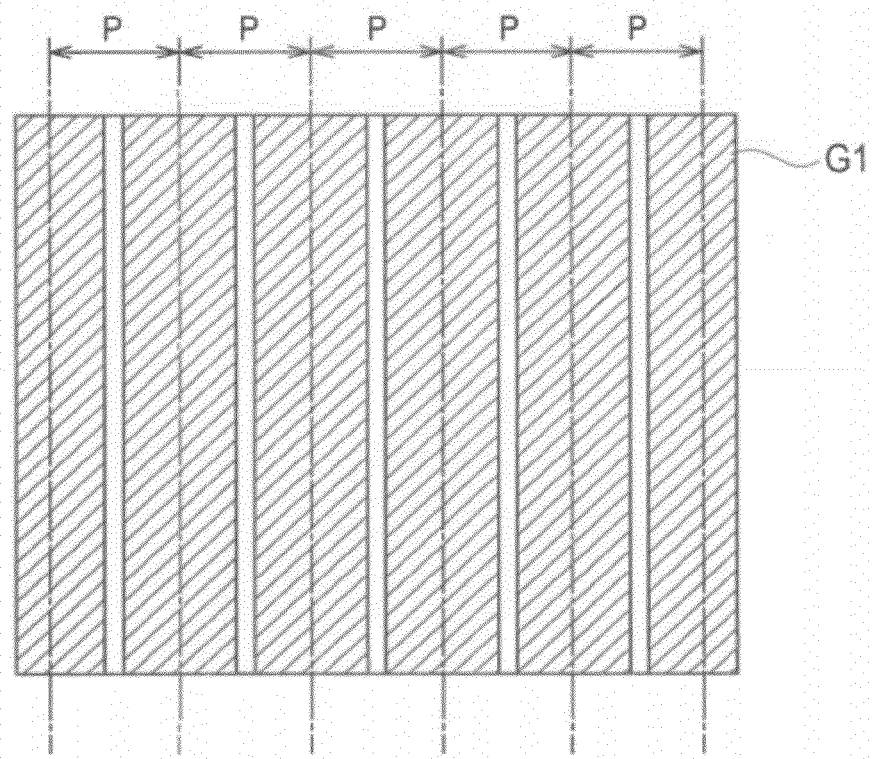
FIG. 18 is a plan view showing an example of a bonding image.

As shown in FIG. 18, the bonding image G1 is an image (striped alignment chart) in which an array of pixels (pixel array) is lit up as a reference line (for example, the center line) of the display panel 2, and in which other arrays of pixels (pixel array) are lit up in a direction orthogonal to the reference line of the display panel 2 at a lens pitch P of the lenticular lens 4a. Note that the reference line is a line which is a reference in various designs forming a three dimensional image. The lens pitch P of the lenticular lens 4a is the width of the cylindrical lens 4a1, i.e., the width of the cylindrical lens 4a1 orthogonal to the axial direction (ridge direction). The bonding image G1 is displayed on a display screen of the display panel 2. In other words, the bonding image G1 is an image in which pixels located on the center line of each lens pitch P of the lenticular lens 4a (including pixels on the reference line) are lit up in line at a lens pitch P.

Next, the control unit 57 images the displayed bonding image G1 (step S43). That is, the control unit 57 causes the stage moving mechanism 52 to move and bond the display panel 2 with respect to the lens plate 4, with the holding frame 53a in the closed state, and then causes the imaging section 54 to execute the imaging operation. Here, the imaging operation is an operation for the imaging of the display panel 2 on the stage moving mechanism 52 through the lens plate 4.

Figure 19:
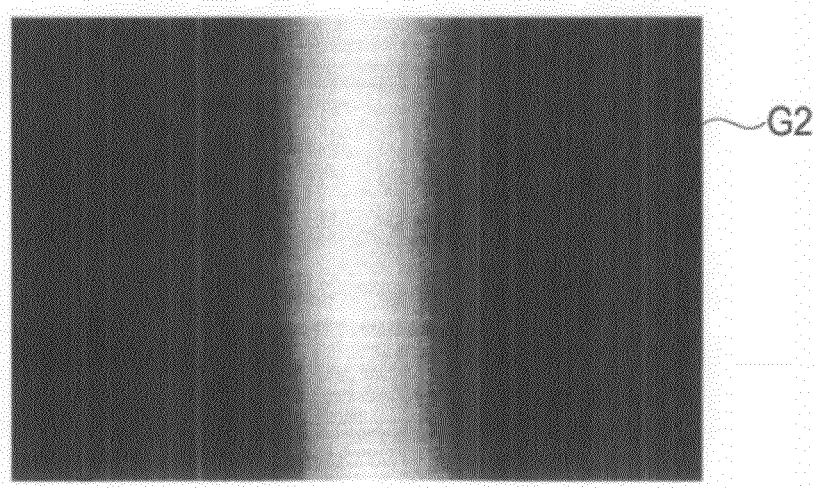
FIG. 19 is a plan view showing an example of a taken image when a gap is within an acceptable range.
Figure 20:
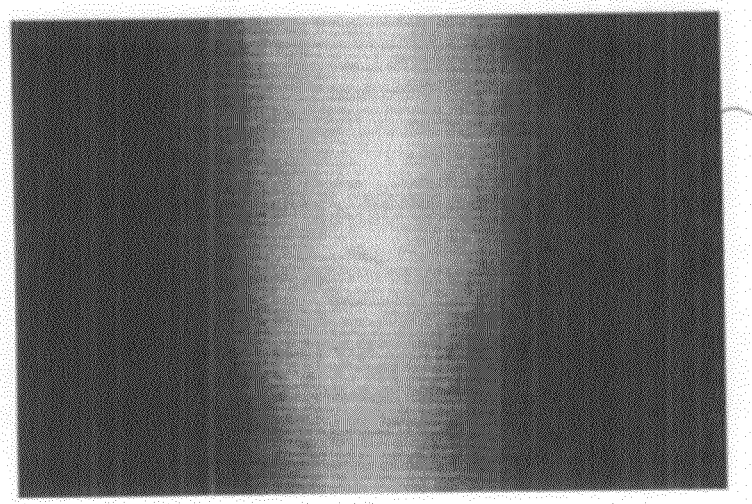
FIG. 20 is a plan view showing an example of the taken image when the gap is greater than the acceptable range.
Figure 21:
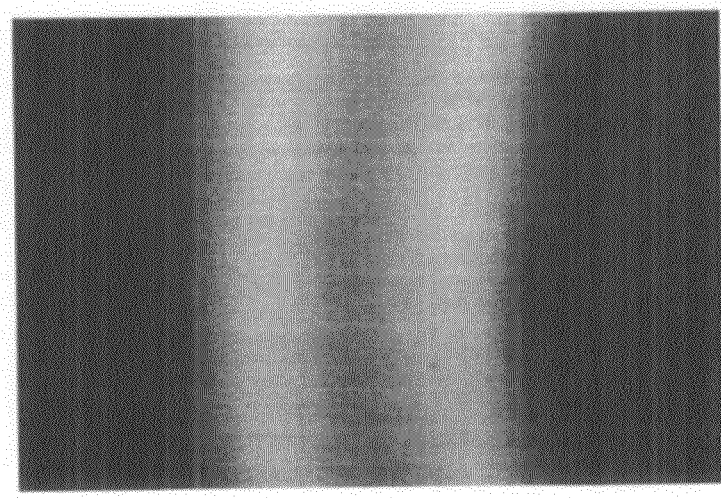
FIG. 21 is a plan view showing an example of the taken image when the gap is smaller than the acceptable range.

As shown in FIGS. 11 and 12, the closed state of the holding frame 53a causes the lens plate 4 to be located between the display panel 2 on the stage moving mechanism 52 and the imaging section 54, and in that state, the imaging operation is performed by the imaging section 54. At this time, the lenticular lens 4a of the lens plate 4 is located on the display panel 2 side. By the imaging operation of the imaging section 54, an image G2 as shown in FIG. 19, an image G3 as shown in FIG. 20, or an image G4 as shown in FIG. 21 is obtained, and the obtained image (taken image) is displayed in the display section 56. The image G2 shown in FIG. 19 is an example of the image when the gap between the display panel 2 and the lenticular lens 4a is within the acceptable range (within a non-defective product range), the image G3 shown in FIG. 20 is an example of the image when the gap between the display panel 2 and the lenticular lens 4a is larger than the acceptable range, and the image G4 shown in FIG. 21 is an example of the image when the gap between the display panel 2 and the lenticular lens 4a is smaller than the acceptable range. For example, the acceptable range is a range of several tens of μm plus or minus a desired value (specified value).

Next, the control unit 57 obtains a brightness distribution in the X-axis direction (direction orthogonal to the reference line) of the taken image by an image processing (step S44), and a smoothing filter is applied to the obtained brightness distribution (step S45). That is, the control unit 57 performs the image processing on the taken image, calculates the brightness distribution in the X-axis direction, and smoothes the calculated brightness distribution with the smoothing filter. The brightness distribution in the X-axis direction is a brightness distribution in a direction orthogonal to a direction of the line on which the pixels are arranged in the center of the lens pitch P (i.e., lit pixels) are aligned.

Figure 22:
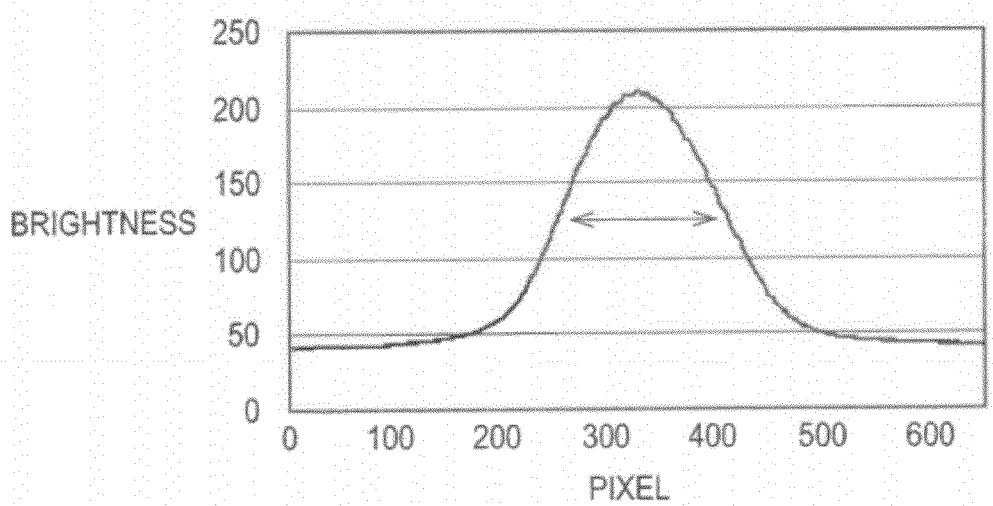
FIG. 22 is an illustrative view for illustrating the brightness distribution of the taken image shown in FIG. 19 in the X-axis direction.
Figure 23:
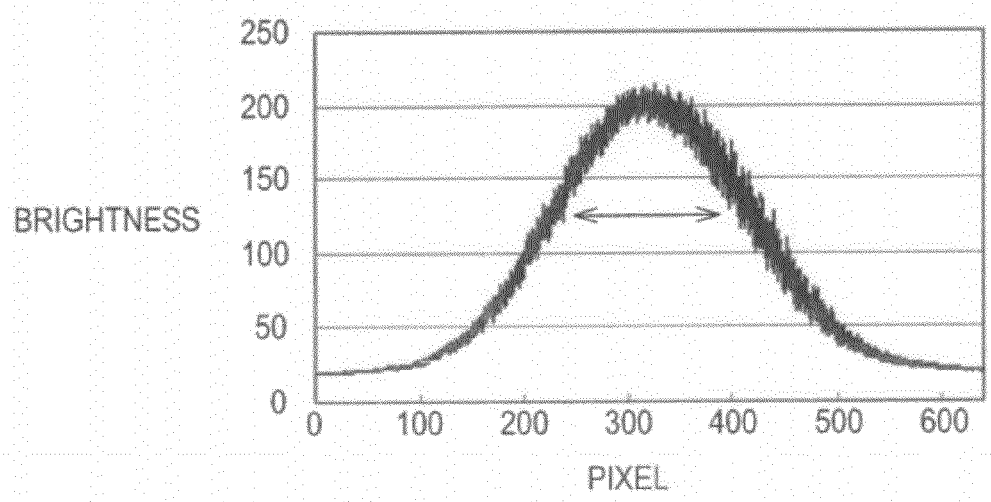
FIG. 23 is an illustrative view for illustrating the brightness distribution of the taken image shown in FIG. 20 in the X-axis direction.
Figure 24:
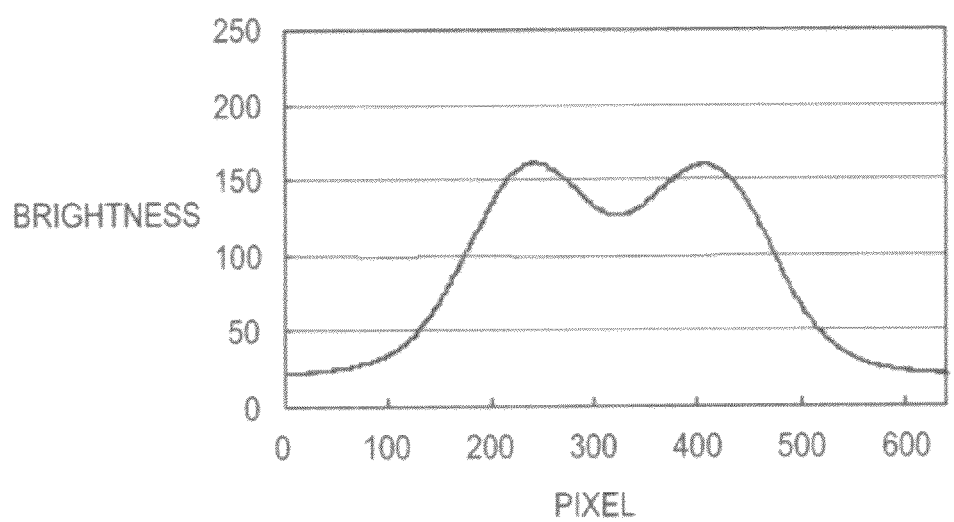
FIG. 24 is an illustrative view for illustrating the brightness distribution of the taken image shown in FIG. 21 in the X-axis direction.

At this time, the brightness distribution as shown in FIG. 22 is obtained when the image G2 shown in FIG. 19 is smoothed by the image processing, and the brightness distribution as shown in FIG. 23 is obtained when the image G3 shown in FIG. 20 is smoothed by the image processing. Moreover, the brightness distribution as shown in FIG. 24 is obtained when the image G4 shown in FIG. 21 is smoothed by the image processing.

Next, the control unit 57 calculates a differential value (step S46) from the brightness distribution after the smooth filtering (see FIG. 22, 23, or 24), and calculates a peak position from a sign inversion section of the differential value (step S47). Then, the control unit 57 judges whether or not the number of peaks is one (step S48) from the calculated peak position. If the control unit 57 judges that the number of peaks is not one (NO in step S48), the gap is increased by a predetermined amount (step S49), and the process returns to step S42. When the number of peaks is not one, the display panel 2 and the lenticular lens 4a are in an excessively proximate state and, therefore the gap is smaller than the acceptable range. On the other hand, if the control unit 57 judges that the number of peaks is one (YES in step S48), a dispersion value of the brightness distribution is calculated (step S50) from the brightness distribution after the smooth filtering (see FIGS. 22, 23, and 24).

Next, the control unit 57 judges whether or not the calculated dispersion value is smaller than a specified value (step S51). If the dispersion value is judged not to be smaller, i.e., judged to be larger, than the specified value (NO in step S51), the gap is reduced by a predetermined amount (step S52), and the process returns to step S42. Here, when the dispersion value is larger than the specified value, the display panel 2 and the lenticular lens 4a are in an excessively distant state and, therefore the gap is larger than the acceptable range. On the other hand, the dispersion value is judged to be smaller than the specified value, (YES in step S51), the gap is within the acceptable range. Thus, the bonding is completed.

When the gap between the display panel 2 on the stage moving mechanism 52 and the lenticular lens 4a is within the acceptable range in this manner, light for curing is irradiated onto the adhesive member 3 in that state so that the adhesive member 3 is cured. Subsequently, the display device 1B is transferred from the stage moving mechanism 52 to a device for full curing by a person such as an operator or a machine such as a robot, and then the adhesive member 3 therein is fully cured.

The manufacturing steps based on the bonding process include a step of causing the display the panel 2 displaying an image to display the bonding image G1, a step of performing imaging via the lens plate 4 with respect to the display panel 2 displaying the bonding image G1, a step of obtaining the brightness distribution of the taken image, and a step of moving the display panel 2 and the lens plate 4 relatively to each other based on the obtained brightness distribution such that the gap (spaced distance) between the display panel 2 and the lenticular lens 4a falls within the acceptable range.

Here, the display panel 2 and the lens plate 4 need to be bonded such that the vertical distance, which is the spaced distance between the convex section (lens end) of the lenticular lens 4a and the color filter F, falls within the acceptable range (for example, a range of several tens of μm plus or minus a desired value), i.e., such that the gap as the spaced distance between the convex section of the lenticular lens 4a and the display panel 2 falls within the acceptable range (for example, a range of several tens of μm plus or minus a desired value). If the gap increases, the vertical distance falls outside the acceptable range and the error in viewing angle also falls outside the acceptable range (for example, outside a range of a desired value plus or minus several tens of μm). Accordingly, the display quality of a three dimensional image is degraded. Particularly, when the three dimensional image display device has a hollow structure in which the display panel 2 and the lenticular lens 4a are apart from each other at a predetermined distance, a gap control thereof is more difficult and, therefore the display quality of a three dimensional image tends to be degraded.

In the manufacturing steps described above, the bonding image G1 is displayed in the display panel 2 in a state where light for image display is irradiated on the display panel 2. The imaging operation is performed on the display panel 2 through the lens plate 4. Accordingly, the image G2 shown in FIG. 19, the image G3 shown in FIG. 20, or the image G4 shown in FIG. 21 is obtained as the taken image. Subsequently, the taken image is subjected to the image processing, the brightness distribution in the X-axis direction is obtained, and the display panel 2 and the lens plate 4 are caused to move relatively to each other based on the brightness distribution such that the gap falls within the acceptable range. Accordingly, since the gap falls within the acceptable range, the error in viewing angle can fall within the acceptable range, so that the degrading of the display quality of a three dimensional image can be prevented.

As described above, in the fourth embodiment, the imaging is performed via the lens plate 4 having the lenticular lens 4a with respect to the display panel 2 displaying the bonding image G1, and the brightness distribution of the taken image G2, G3, or G4 in the X-axis direction (direction orthogonal to the reference line) is obtained. Based on the obtained brightness distribution, the display panel 2 and the lens plate 4 are caused to move relatively to each other such that the gap between the display panel 2 and the lenticular lens 4a falls within the acceptable range, and thereby it becomes possible to control the gap based on the brightness distribution of the taken image G2, G3, or G4, and easily keep the gap within the acceptable range. Accordingly, the gap falls within the acceptable range and the error in viewing angle can fall within the acceptable range so that the degrading of the display quality of a three dimensional image can be prevented.

Furthermore, the bonding image G1 is displayed, in which one array of pixels (pixel array) of being the reference line (for example, the center line) of the display panel 2 and other arrays of pixels (pixel array) are lit up at a lens pitch (width) P of the lenticular lens 4a from the reference line of the display panel 2 in the direction orthogonal to the reference line.

Subsequently, a brightness distribution is obtained as a brightness distribution in the direction (for example, X-axis direction) orthogonal to the direction of the line on which the pixels are arranged so that a gap change can be detected with high precision. Thus, the gap control can be performed accurately.

By providing the control unit 57 as the generating section which generates the alignment chart signals as the bonding image G1, a transmission line 73 which transmits the generated alignment chart signals to the signal interface 71 of the display panel 2, and the connector section 72 which is formed to be connectable to the signal interface 71 and is provided to the transmission line 73, the display of the display panel 2 can be controlled by the control unit 57. Accordingly, an external device can cause the display panel 2 to display the bonding image G1.

In addition, since the light irradiation section 59 is provided, and the bonding image G1 is displayed on the display panel 2 while the light irradiation section 59 is caused to execute the irradiation operation, the image can be displayed by the irradiation of the light irradiation section 59 even when the display panel 2 is a panel such as a liquid crystal panel which cannot emit light by itself.

Other Embodiments

Note that the present invention is not limited to the embodiments described above, and various modifications are possible without departing from the gist thereof.

For example, although a liquid crystal display (LCD) panel is used as the display panel 2 in the first to fourth embodiments described above, the display panel 2 is not limited thereto. A plasma display panel (PDP), a field emission display (FED) panel, a surface-conduction electron-emitter display (SED) panel, or the like may be used. In the second to fourth embodiments described above, if the display panel 2 is capable of emitting light by itself to display the image, the display panel 2 may be connected to the control unit 41 or 57 to display an image as necessary. In this case, it is unnecessary to use the light irradiation section 43 or 59.

Moreover, in the first embodiment described above, the depressurization chamber 12 is depressurized so that the gas in the inner space N is sucked from the opening section K and the inner space N is also depressurized. However, the depressurization is not limited thereto, but a mechanism which directly sucks the gas in the inner space N from the opening section K may be provided instead of the depressurization chamber 12 to depressurize the inner space N by the mechanism, for example.

Although the bonding image G1 as shown in FIG. 18 is displayed in the fourth embodiment described above, it is not limited thereto. The image is not limited. In addition, although feature quantities such as the number of peaks of the brightness distribution, the dispersion value of the brightness distribution, and the like are used for the gap control in the fourth embodiment, it is not limited thereto. The feature quantity to be used from the brightness distribution is not limited.

Finally, although various values are mentioned in the embodiments described above, the values are examples and are not limited.

What is claimed is:

1. A method of manufacturing a three dimensional image display device, comprising:
    bonding a lens plate having a lenticular lens to a display panel configured to display an image, with a partially-discontinuous frame-shaped adhesive member interposed in between while having the lenticular lens facing the display panel to completely bond the lenticular lens to the display panel so that a spaced distance between a convex section of the lenticular lens and a color filter provided in the display panel is within a predetermined distance; and
    depressurizing a hermetic inner space formed by the display panel, the adhesive member, and the lens plate, and sealing an opening section communicating with the inner space.

2. A method of manufacturing a three dimensional image display device, comprising
    bonding a lens plate having a lenticular lens to a display panel configured to display an image, with a continuous frame-shaped adhesive member interposed in between in reduced-pressure atmosphere while having the lenticular lens facing the display panel to completely bond the lenticular lens to the display panel so that a spaced distance between a convex section of the lenticular lens and a color filter provided in the display panel is within a predetermined distance.

3. A method of manufacturing a three dimensional image display device, comprising:
    bonding a lens plate having a lenticular lens to a display panel configured to display an image, with a partially-discontinuous frame-shaped adhesive member interposed in between, while having the lenticular lens facing the display panel to completely bond the lenticular lens to the display panel so that a spaced distance between a convex section of the lenticular lens and a color filter provided in the display panel is within a predetermined distance; and
    heating gas in a hermetic inner space formed by the display panel, the adhesive member, and the lens plate, and sealing an opening section communicating with the inner space.

4. A method of manufacturing a three dimensional image display device, comprising:
    bonding a lens plate having a lenticular lens to a display panel configured to display an image, with a continuous frame-shaped adhesive member while filling a getter agent in between, while having the lenticular lens facing the display panel to completely bond the lenticular lens to the display panel so that a spaced distance between a convex section of the lenticular lens and a color filter provided in the display panel is within a predetermined distance; and
    heating and activating the getter agent.

5. The method of manufacturing a three dimensional image display device according to claim 1, wherein any one or both of the lens plate and the display panel are pressed in a direction to make the lens plate and the display panel coherent to each other.

6. A method of manufacturing a three dimensional image display device, comprising:
    manufacturing a three dimensional image display device by use of an apparatus for manufacturing a three dimensional image display device including a display panel configured to display an image; a lens plate having a lenticular lens and provided on the display panel with the lenticular lens facing the display panel; a frame-shaped adhesive member which is provided between the display panel and the lens plate so as to surround the lenticular lens and which bonds the display panel to the lens plate; a first polarizer provided on a first surface of the display panel and inside a frame of the adhesive member, the first surface being located on a side of the lenticular lens; and a second polarizer provided on a second surface of the display panel opposite to the first surface to cover an entire region of the second surface, the apparatus including
    a bonding mechanism configured to perform bonding
        by causing the display panel and the lens plate to move relatively to each other in an approaching direction with the adhesive member interposed in between while having the lenticular lens facing the first surface of the display panel;
        by applying a pressure directly to an outer surface region of the lens plate to press the adhesive member from a lens plate side, the outer surface region being opposite to the adhesive member; and
        by applying a pressure directly to an outer surface region of the second polarizer to press the adhesive member from a display panel side, the outer surface region being opposite to the adhesive member.

7. A method of manufacturing a three dimensional image display device, in which a display panel and lens plate having a lenticular lens are bonded, the display panel having a plurality of pixels arranged on a plane in a predetermined pattern, the lenticular lens having a plurality of cylindrical lenses consecutively arranged in a width direction orthogonal to a ridge direction of the cylindrical lens, the method comprising:

causing the display panel to display a bonding image in which one array of the pixels are lit up as a reference line of the display panel as well as other arrays of the pixels are lit up in a direction orthogonal to the reference line at a pitch of a width of the cylindrical lens;

taking an image of the display panel displaying the bonding image, through the lens plate;

obtaining a brightness distribution in a direction orthogonal to the reference line, from the taken image; and causing the display panel and the lens plate to move relatively to each other based on the obtained brightness distribution so that a spaced distance between the display panel and the lenticular lens falls within an acceptable range.

8. The method of manufacturing a three dimensional image display device according to claim 7, wherein the bonding image is displayed while light is irradiated on the display panel.

* * * * *